(12) United States Patent
Moriyama

(10) Patent No.: US 7,928,848 B2
(45) Date of Patent: Apr. 19, 2011

(54) RFID TAG PRODUCING APPARATUS

(75) Inventor: Satoru Moriyama, Iwakura (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 319 days.

(21) Appl. No.: 12/218,809

(22) Filed: Jul. 18, 2008

(65) Prior Publication Data

US 2009/0031553 A1     Feb. 5, 2009

(30) Foreign Application Priority Data

Aug. 2, 2007  (JP) ................................ 2007-201708

(51) Int. Cl.
*G08B 13/14* (2006.01)

(52) U.S. Cl. ............... 340/572.8; 340/572.1; 340/572.7; 235/451; 29/600; 29/737; 400/76; 400/70

(58) Field of Classification Search .................... 29/600, 29/729, 739; 235/451, 375; 400/70, 79, 400/621; 340/572.1–572.8
See application file for complete search history.

(56) References Cited

U.S. PATENT DOCUMENTS

| | | | | |
|---|---|---|---|---|
| 6,246,326 B1 * | 6/2001 | Wiklof et al. | ............... | 340/572.1 |
| 7,475,819 B2 * | 1/2009 | Moriyama et al. | ............ | 235/451 |
| 7,555,826 B2 * | 7/2009 | Armijo et al. | ................... | 29/600 |
| 7,669,318 B2 * | 3/2010 | Munn | ............................. | 29/832 |
| 7,731,093 B2 * | 6/2010 | Isemura et al. | ............... | 235/492 |
| 2008/0238689 A1 * | 10/2008 | Ohashi | ........................ | 340/572.8 |

FOREIGN PATENT DOCUMENTS

| | | |
|---|---|---|
| EP | 1394718 | 3/2004 |
| EP | 1796022 | 6/2007 |
| EP | 1985455 | 10/2008 |
| JP | 2005254566 | 9/2005 |
| WO | WO2007/052679 | 5/2007 |

* cited by examiner

*Primary Examiner* — Minh Trinh
(74) *Attorney, Agent, or Firm* — Day Pitney LLP

(57) ABSTRACT

This disclosure discloses an RFID tag producing apparatus comprising: a first antenna device that transmits and receives information to and from an RFID circuit element; a writing control portion that writes a command signal for commanding operation of at least one operating device so as to produce a command RFID tag; a second antenna device that transmits and receives information to and from the command RFID tag; a reading control portion that acquires the command signal; and a device control portion, based on information obtained by the reading control portion, that controls the at least one operating device.

9 Claims, 25 Drawing Sheets

[FIG. 1]
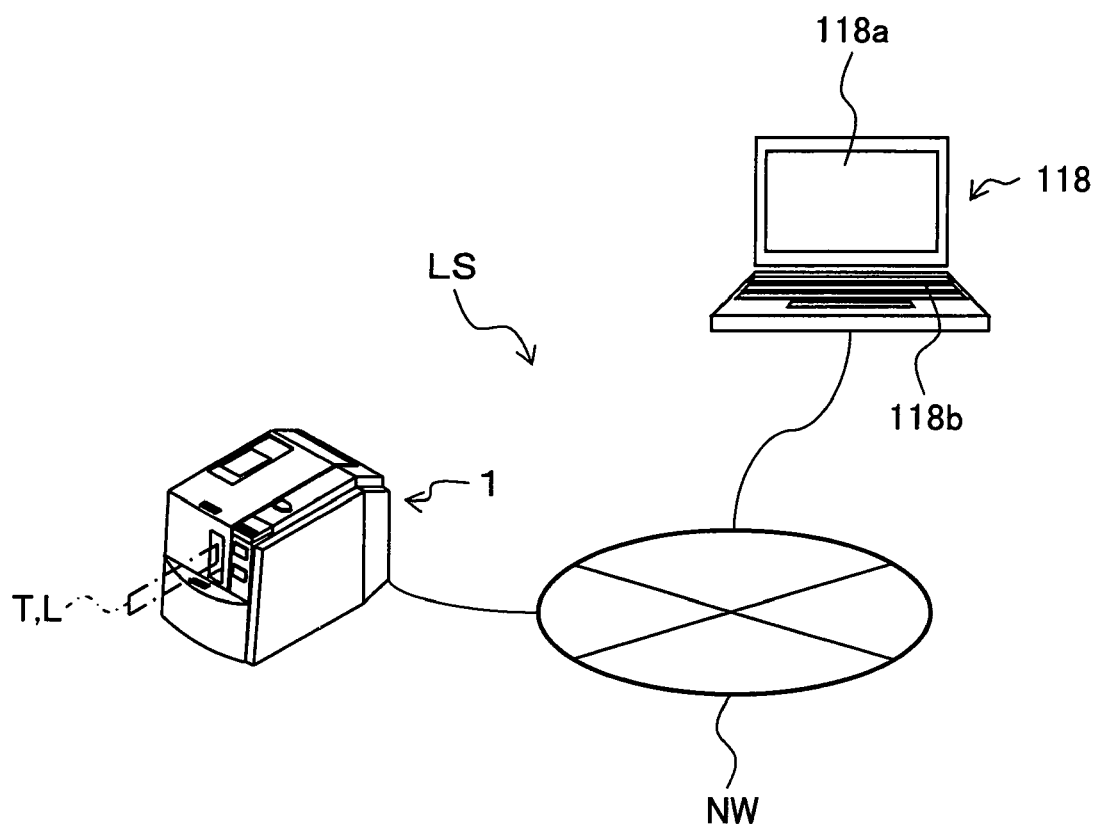

[FIG. 2]
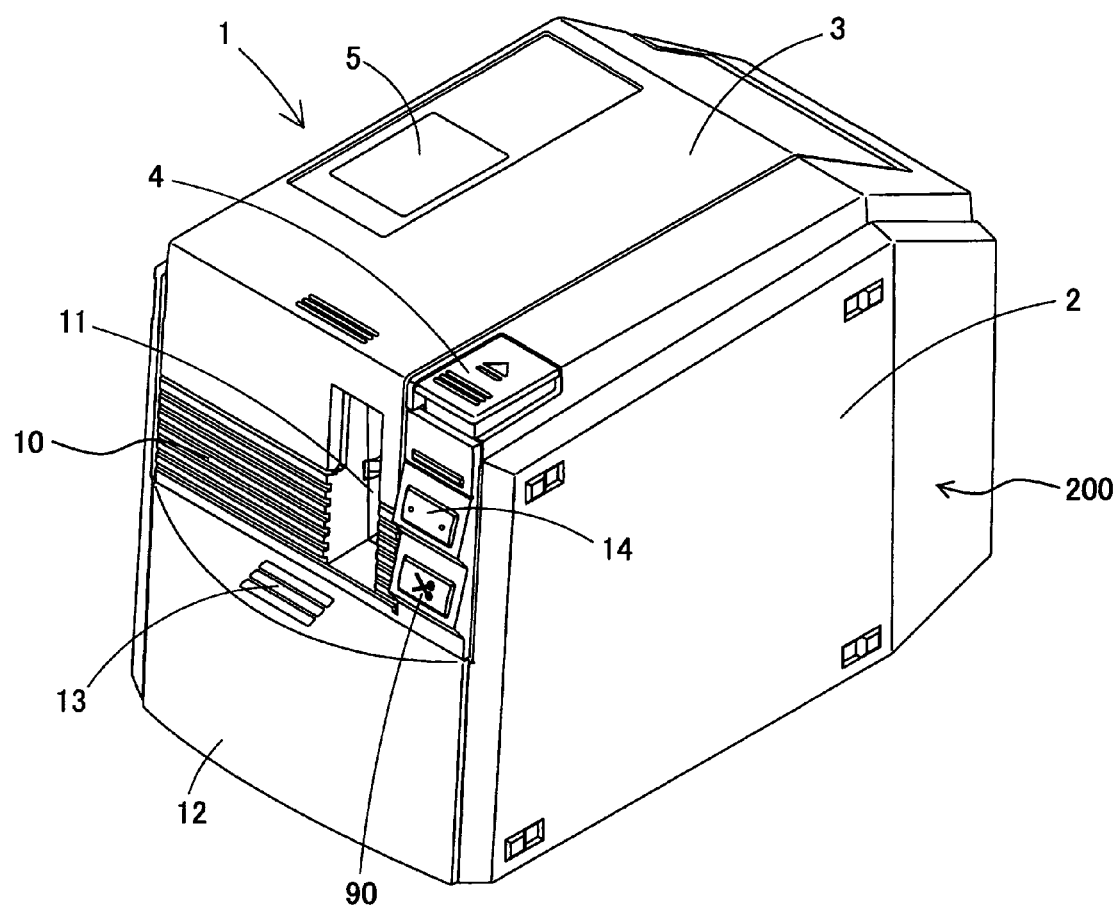

[FIG. 3]
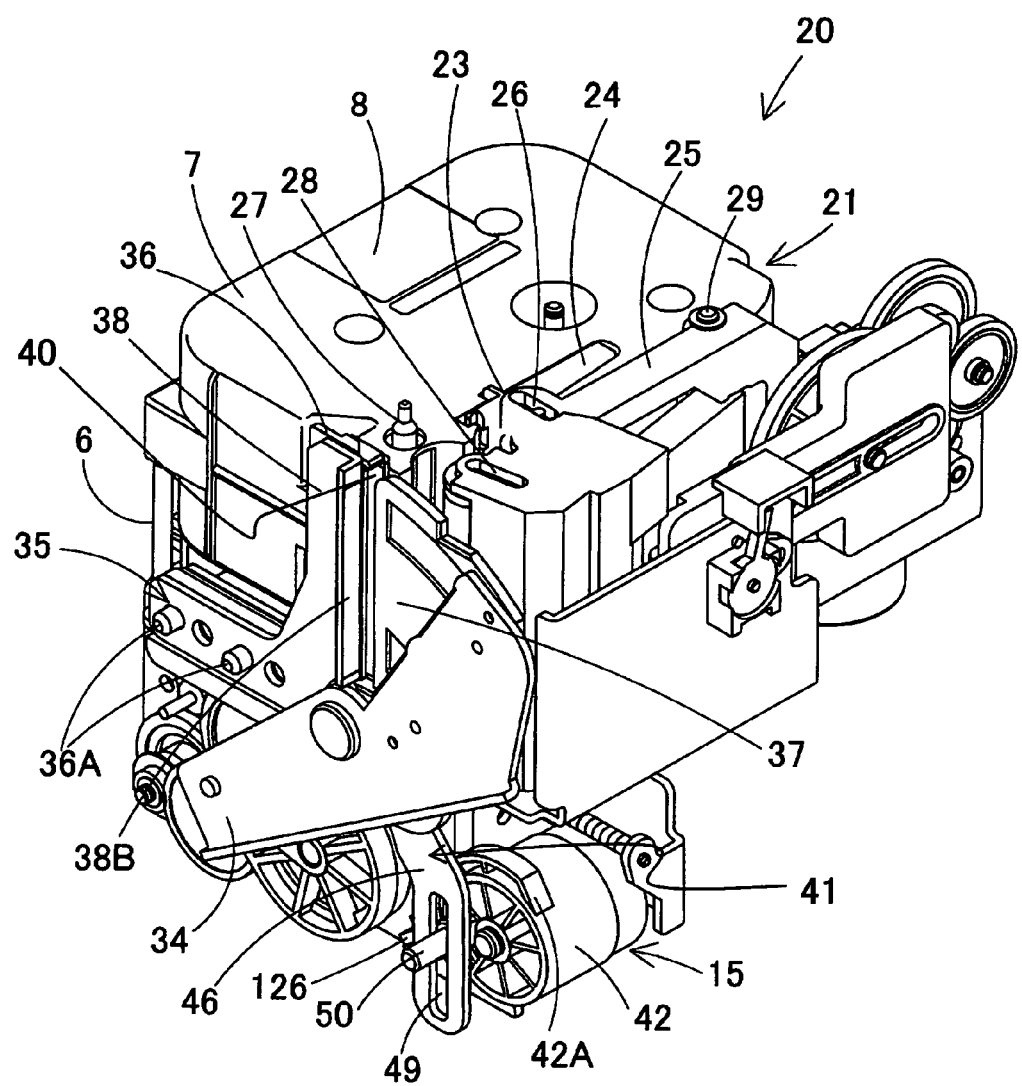

[FIG. 4]
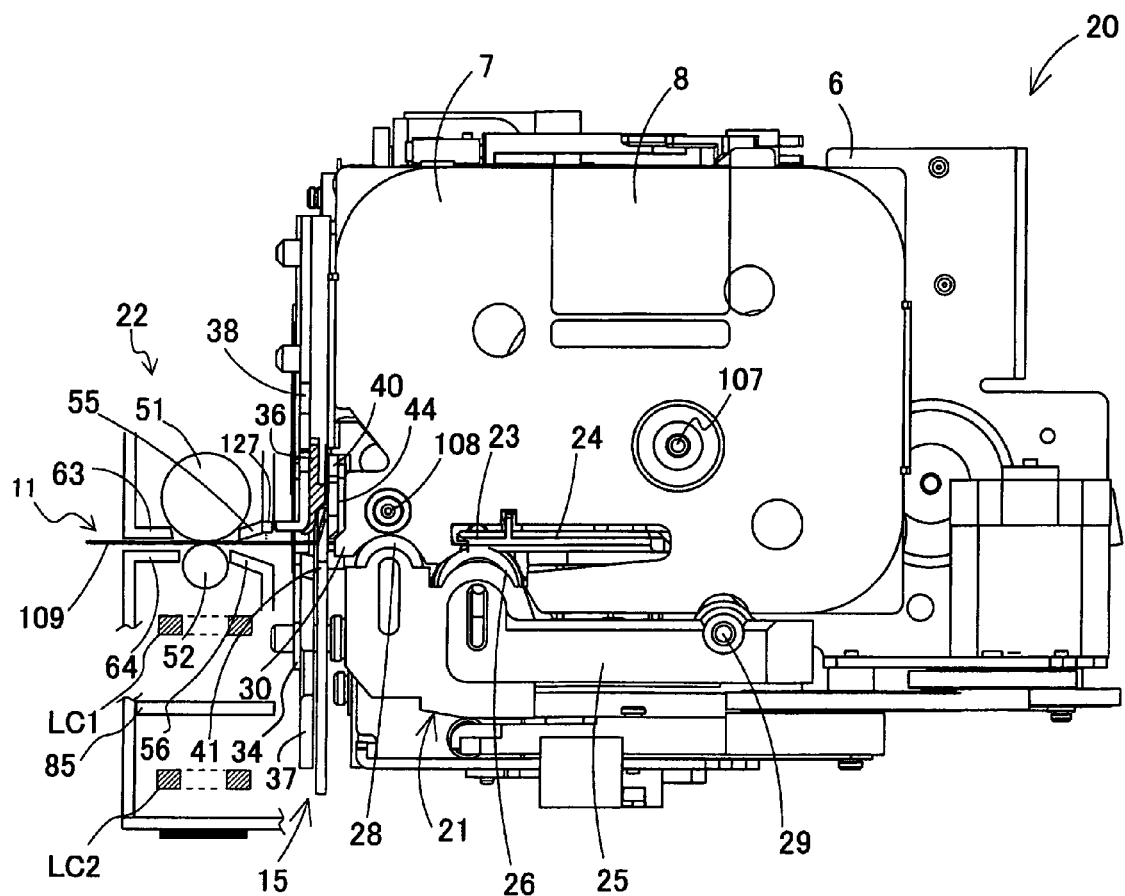

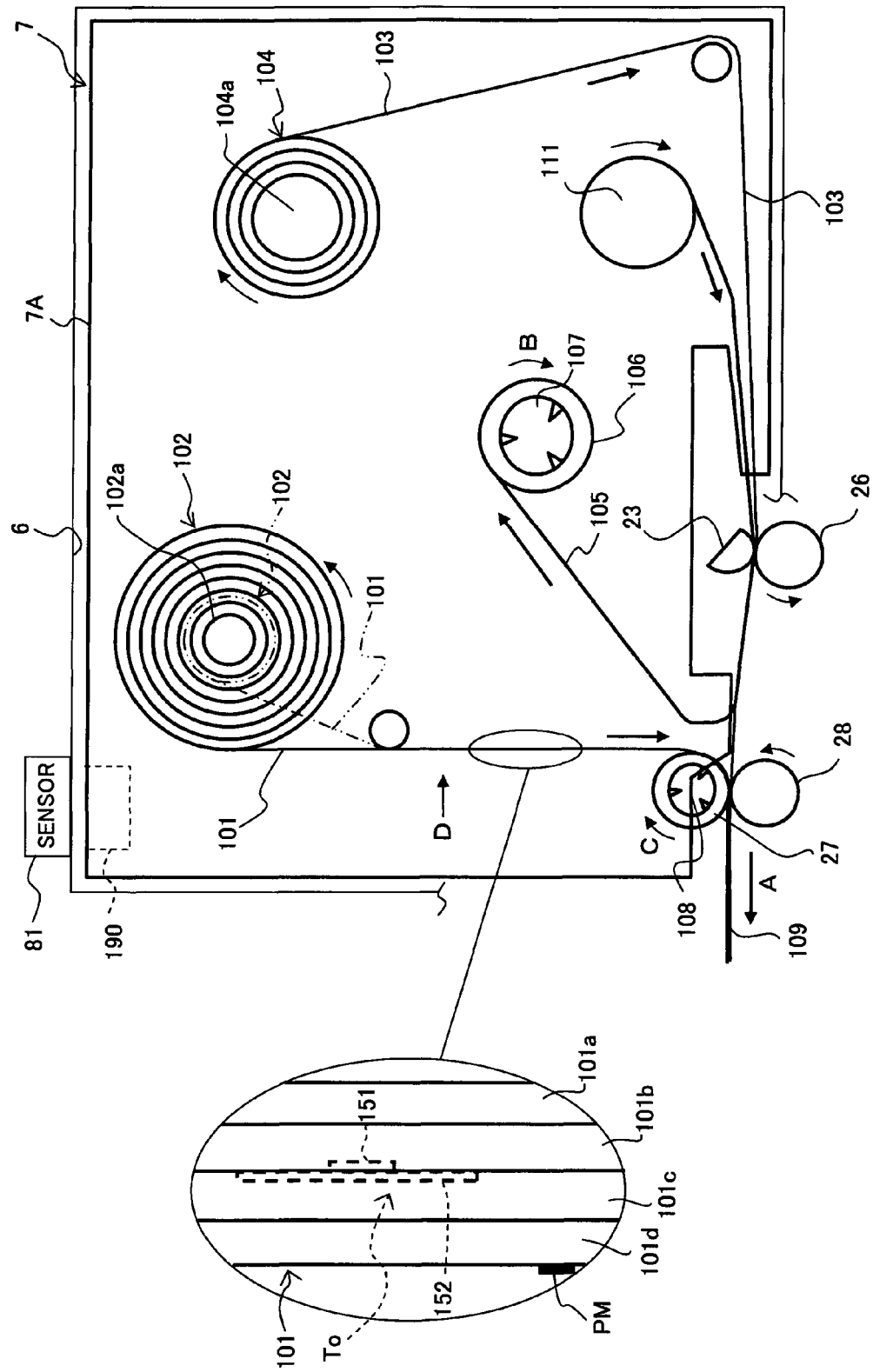
[FIG.5]

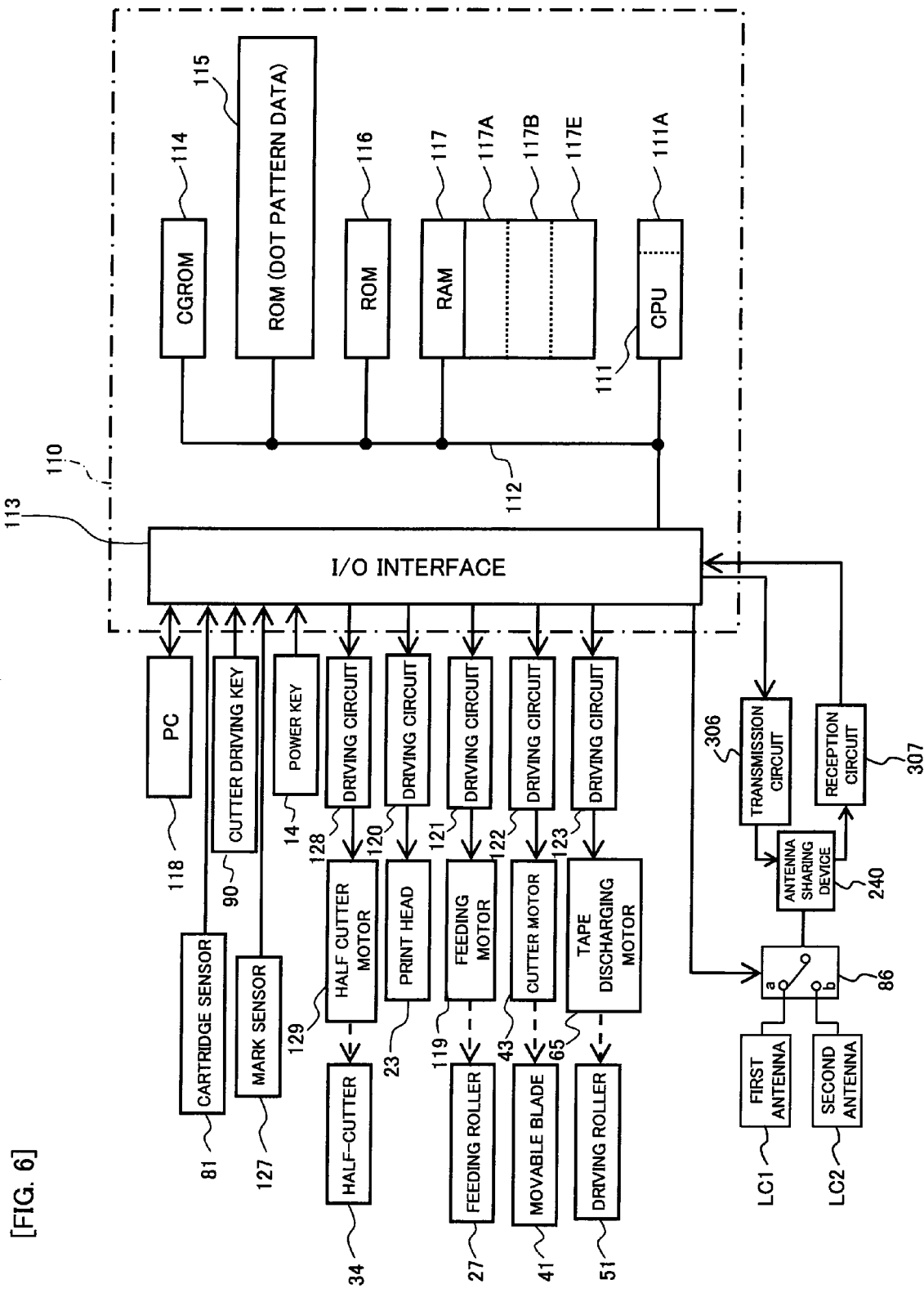
[FIG. 6]

[FIG. 7]
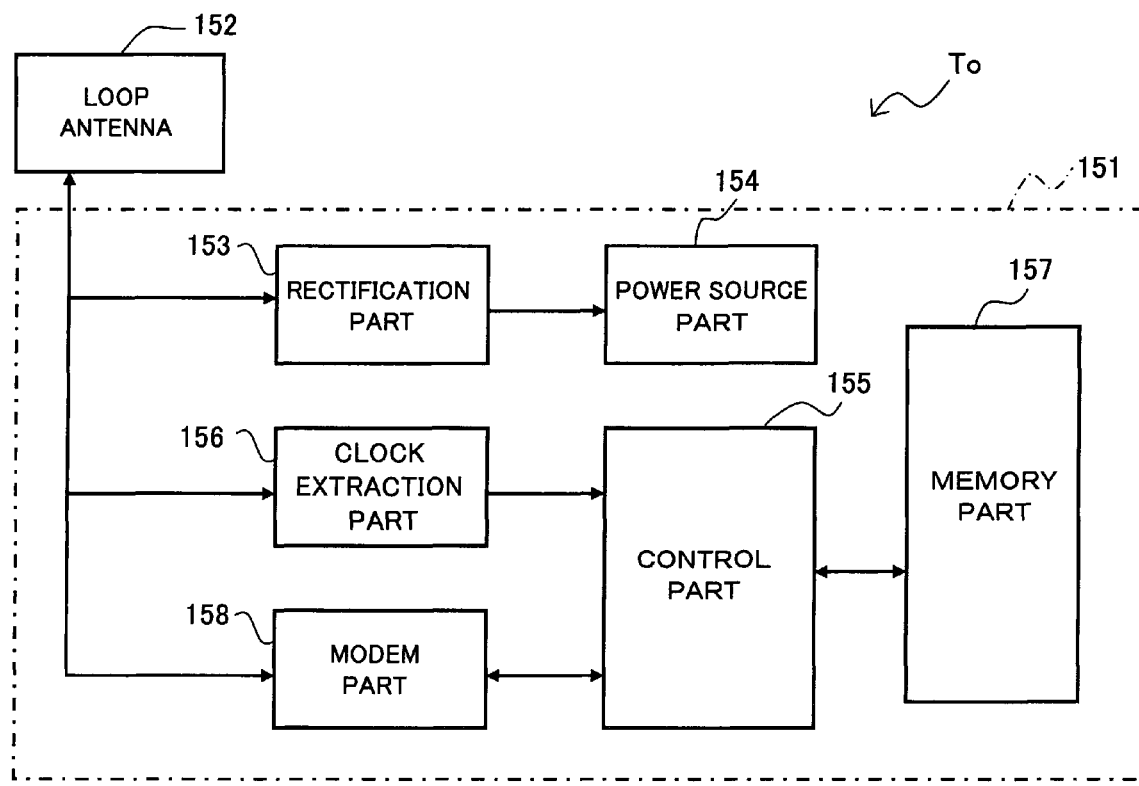

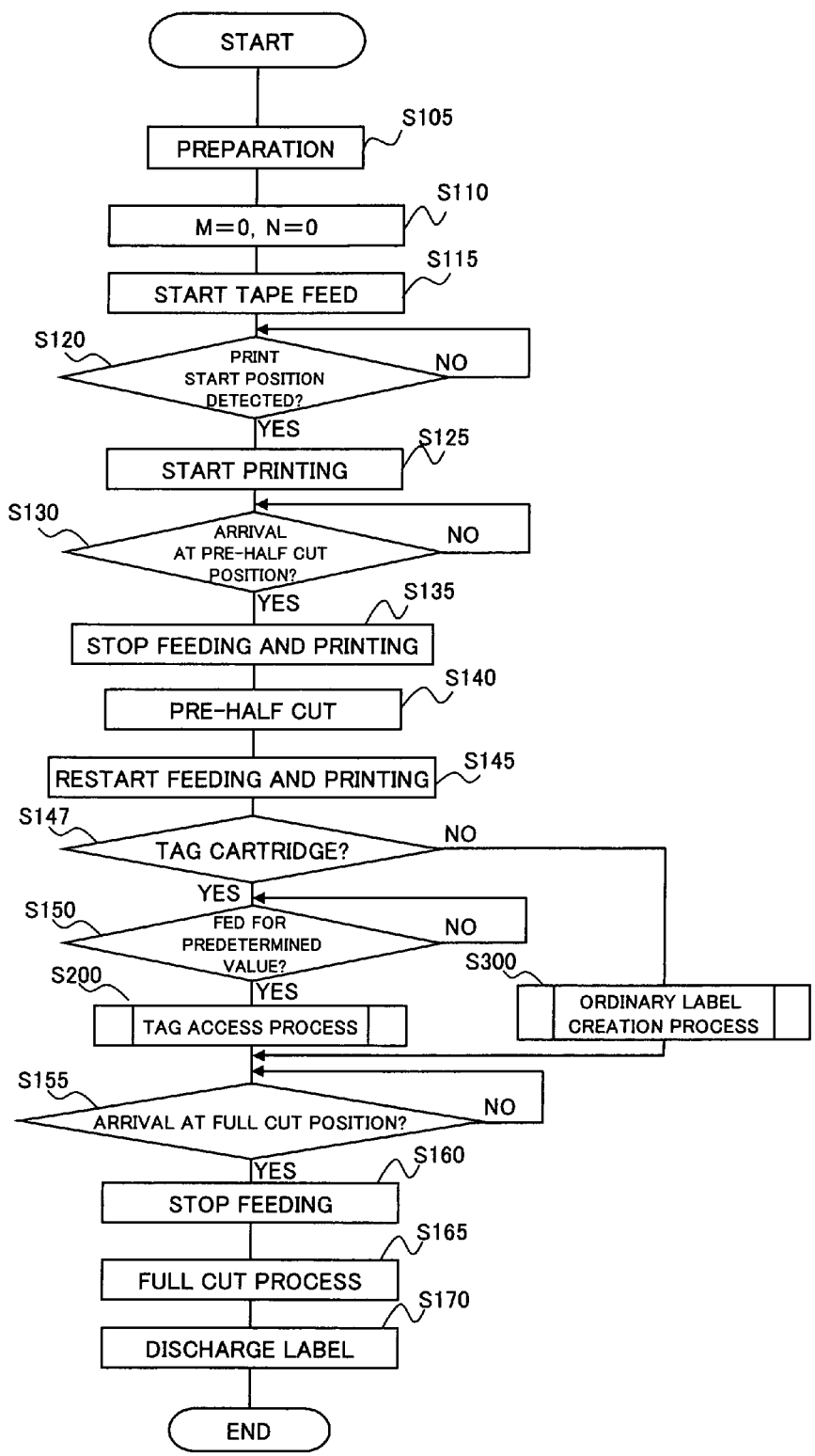
[FIG.8]

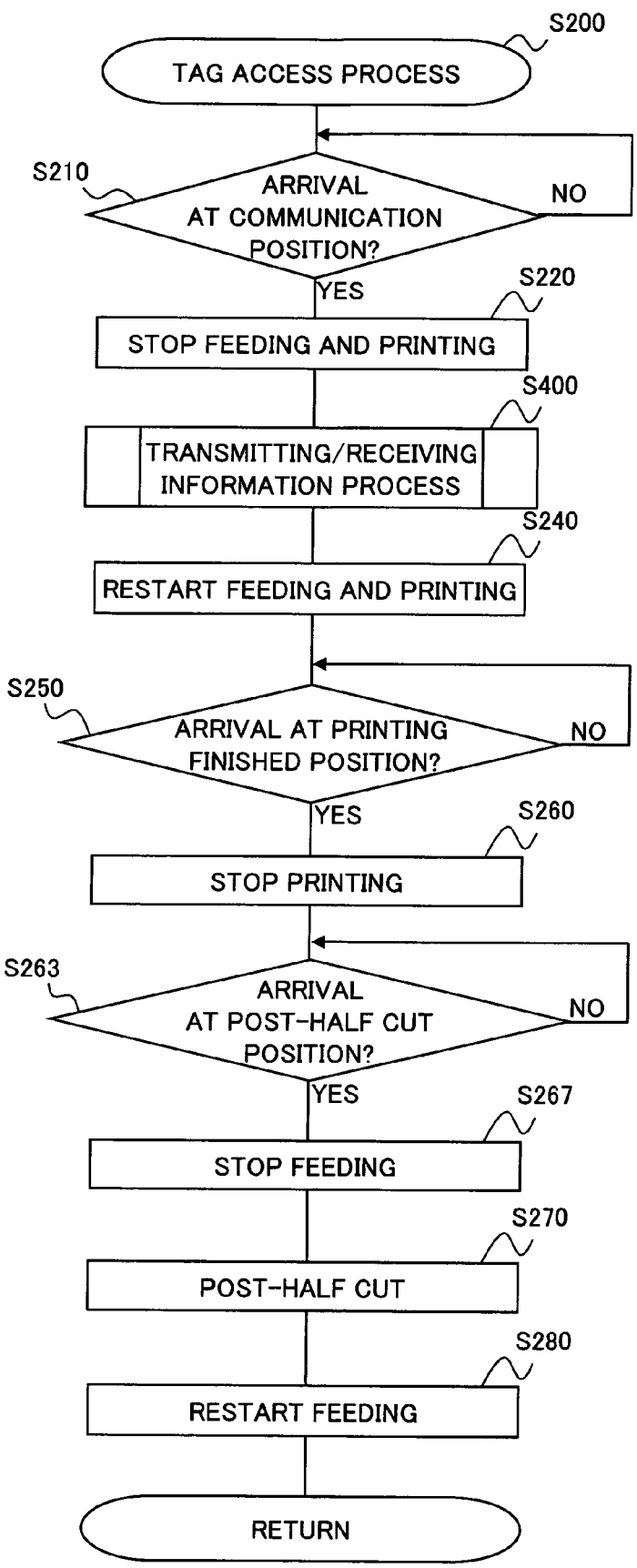
[FIG. 9]

[FIG. 10]
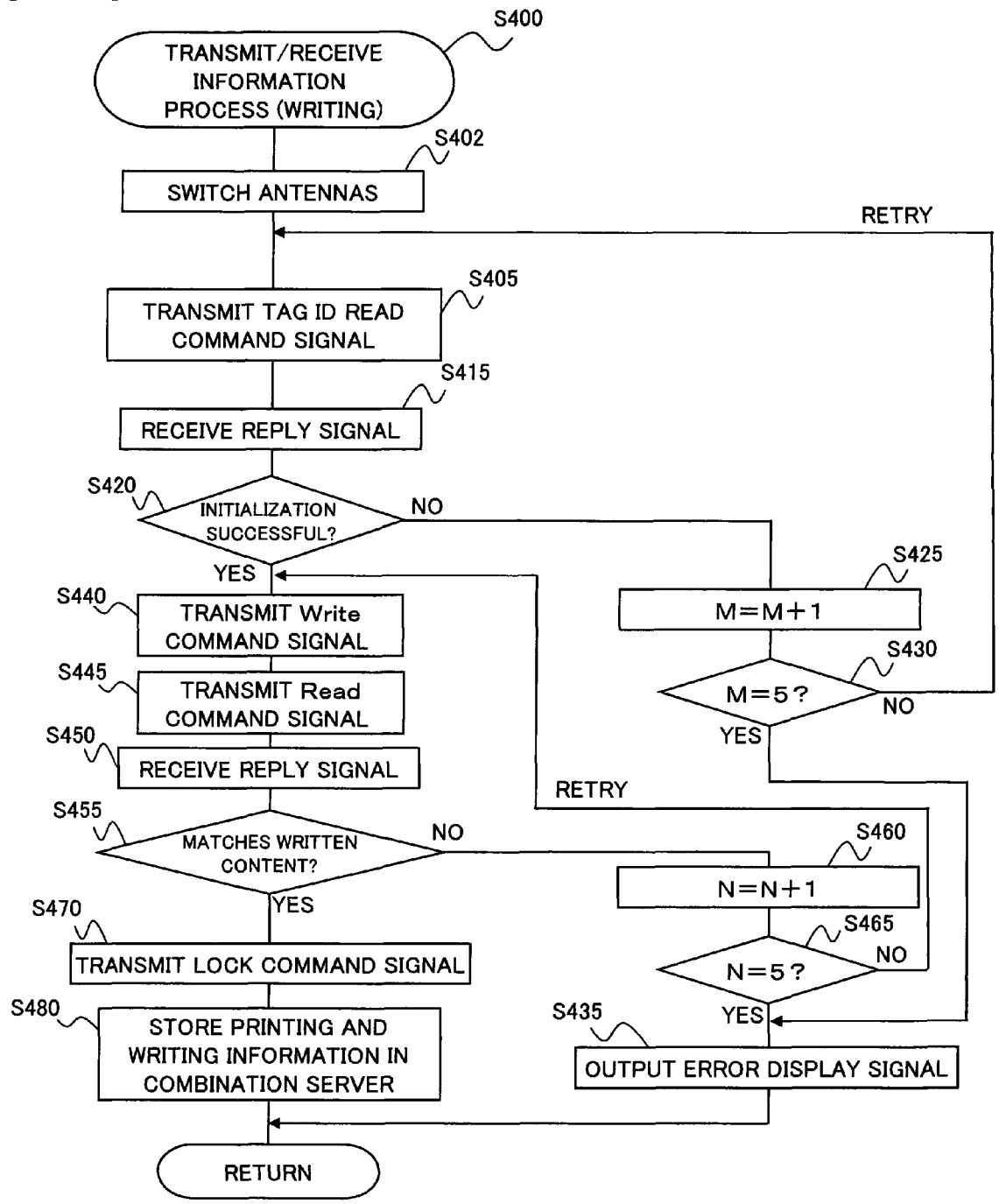

[FIG. 11]
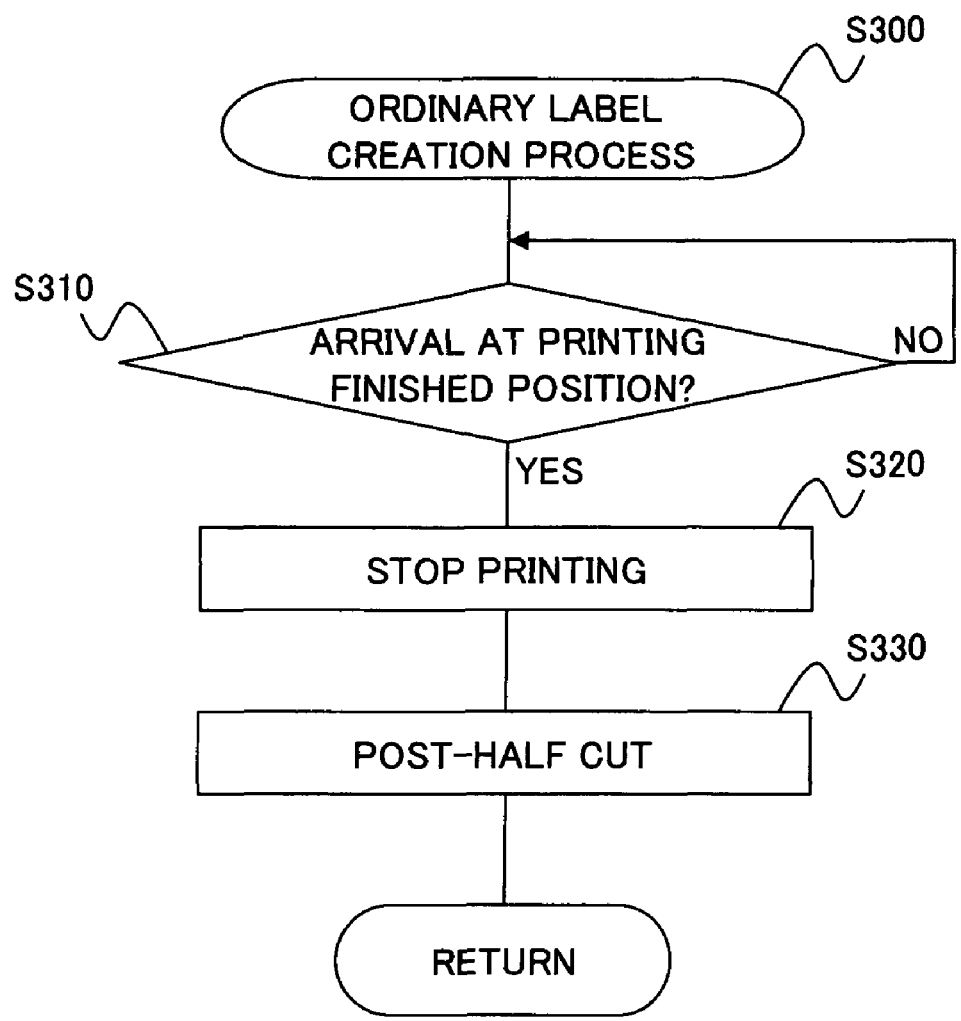

[FIG. 12A]
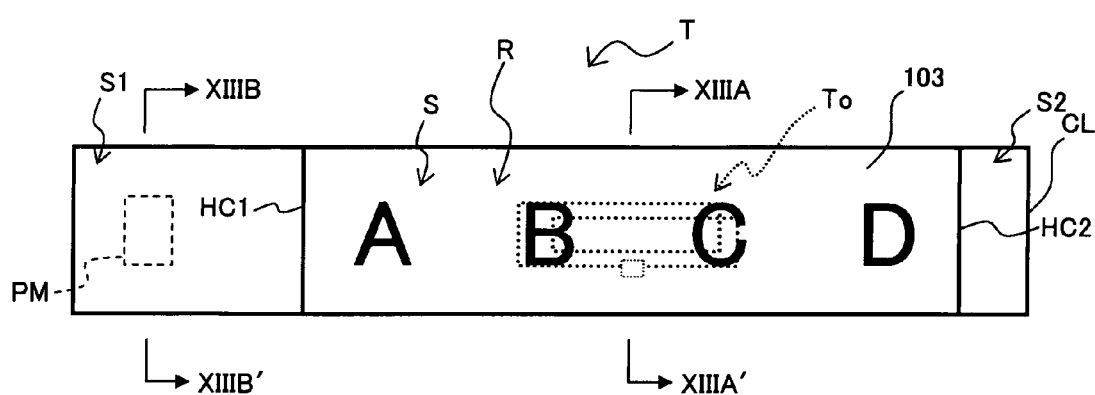
[FIG. 12B]
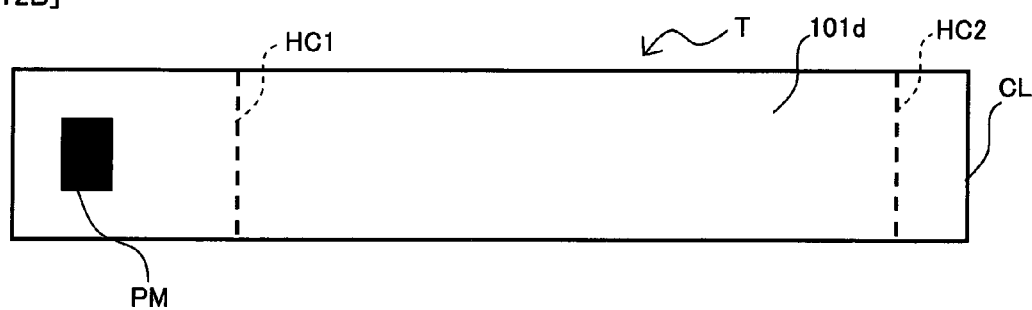

[FIG. 13A]
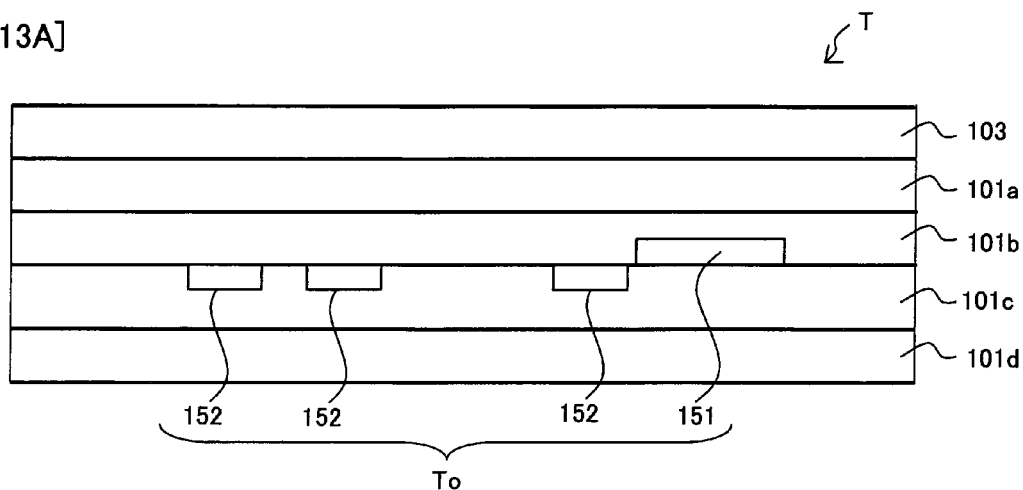
[FIG. 13B]
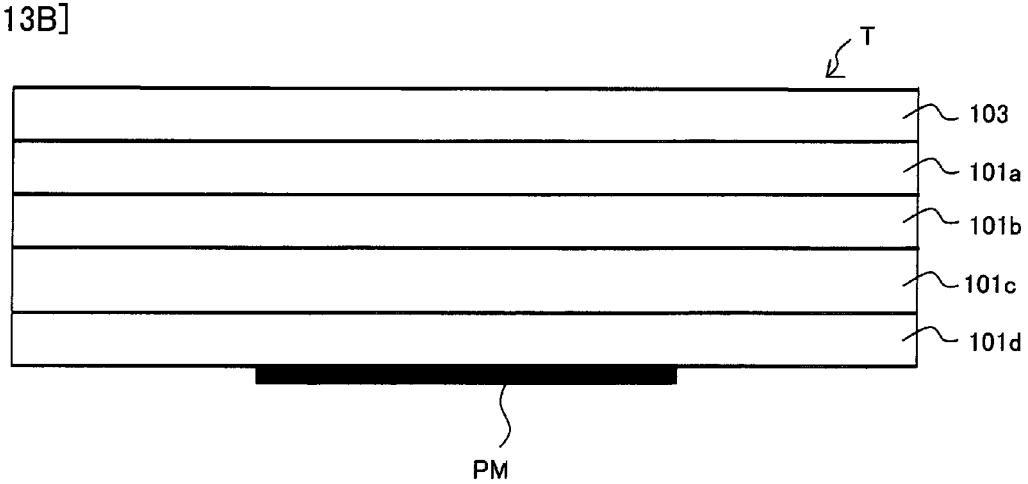

[FIG. 14]
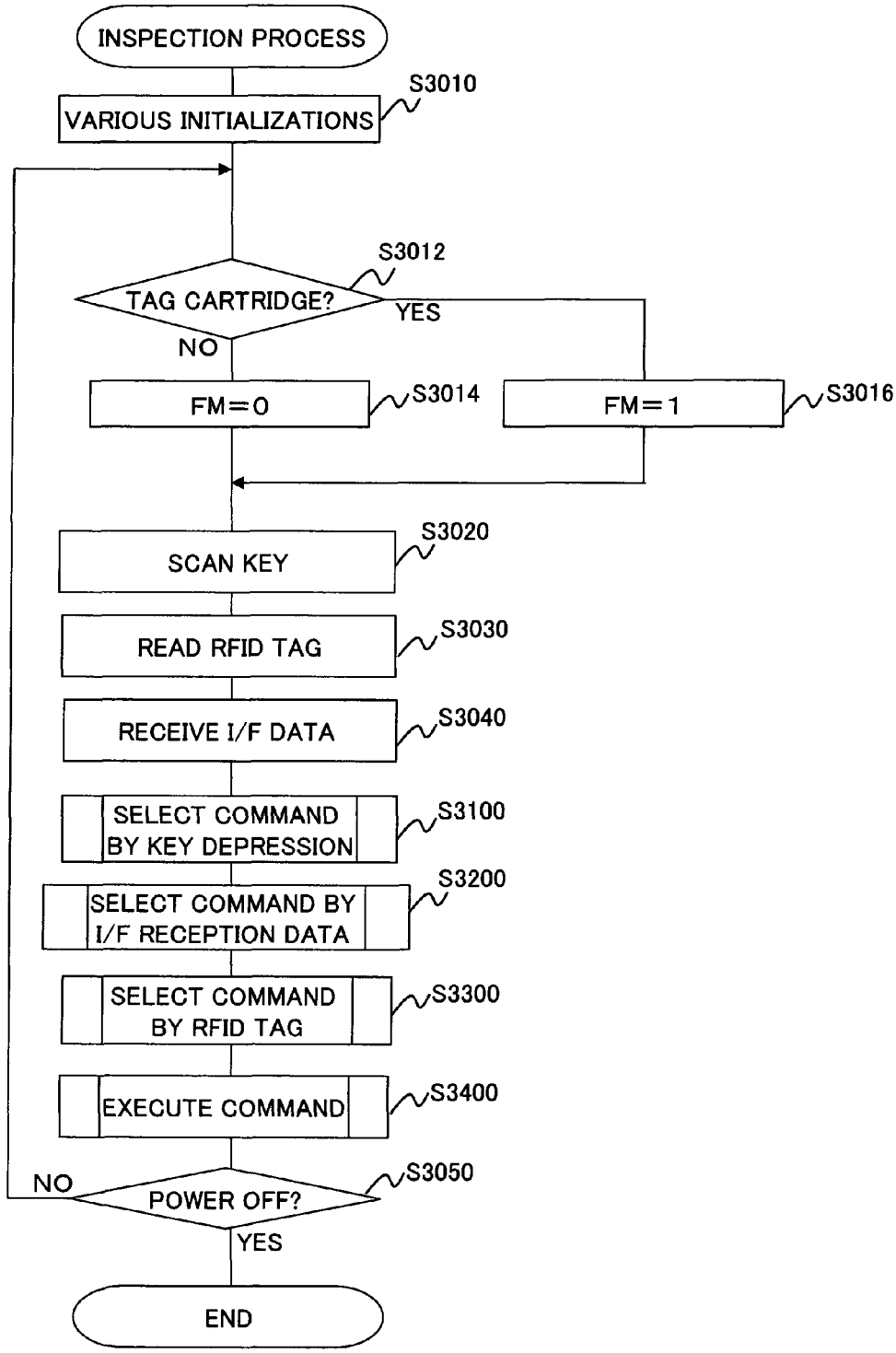

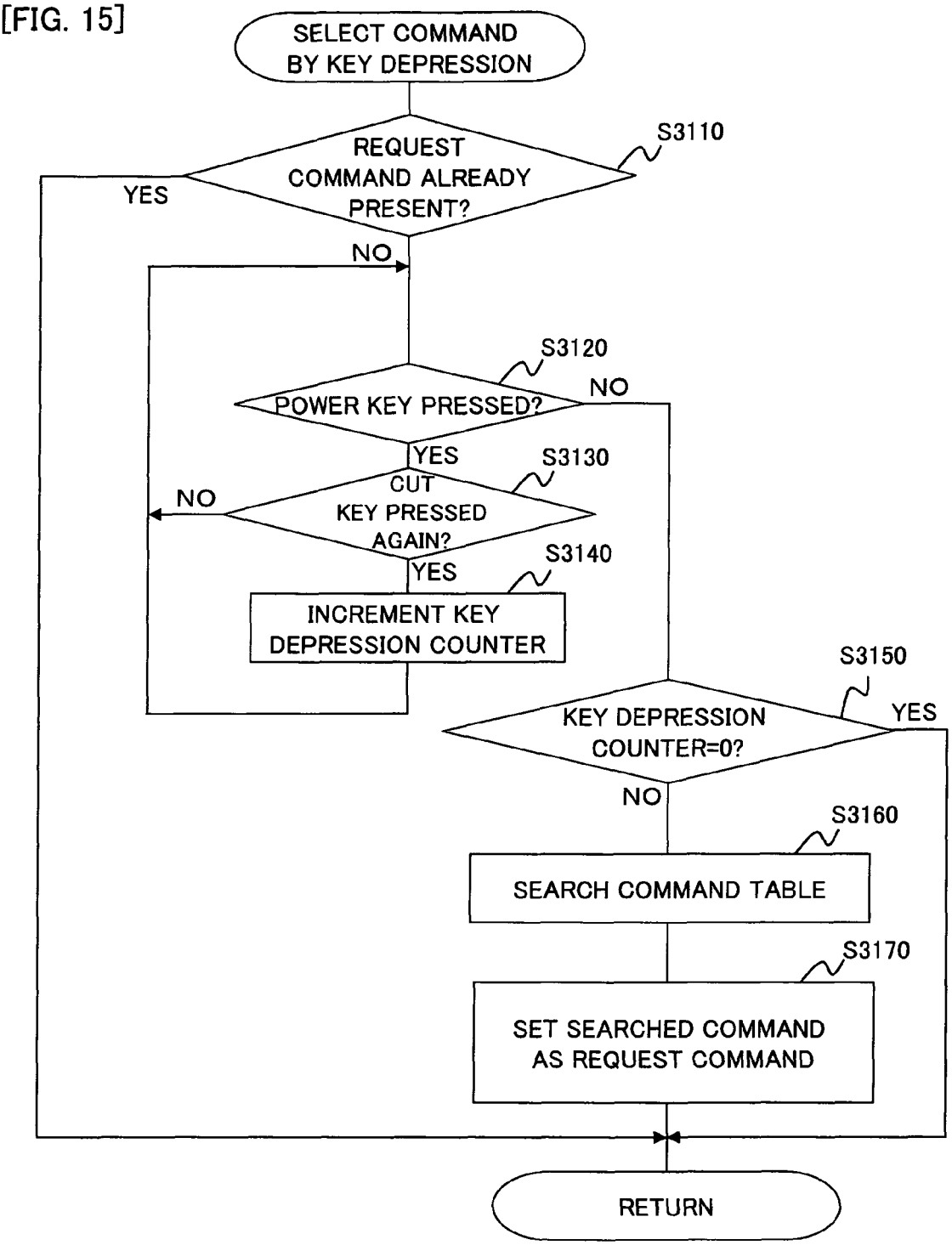
[FIG. 15]

[FIG. 16]
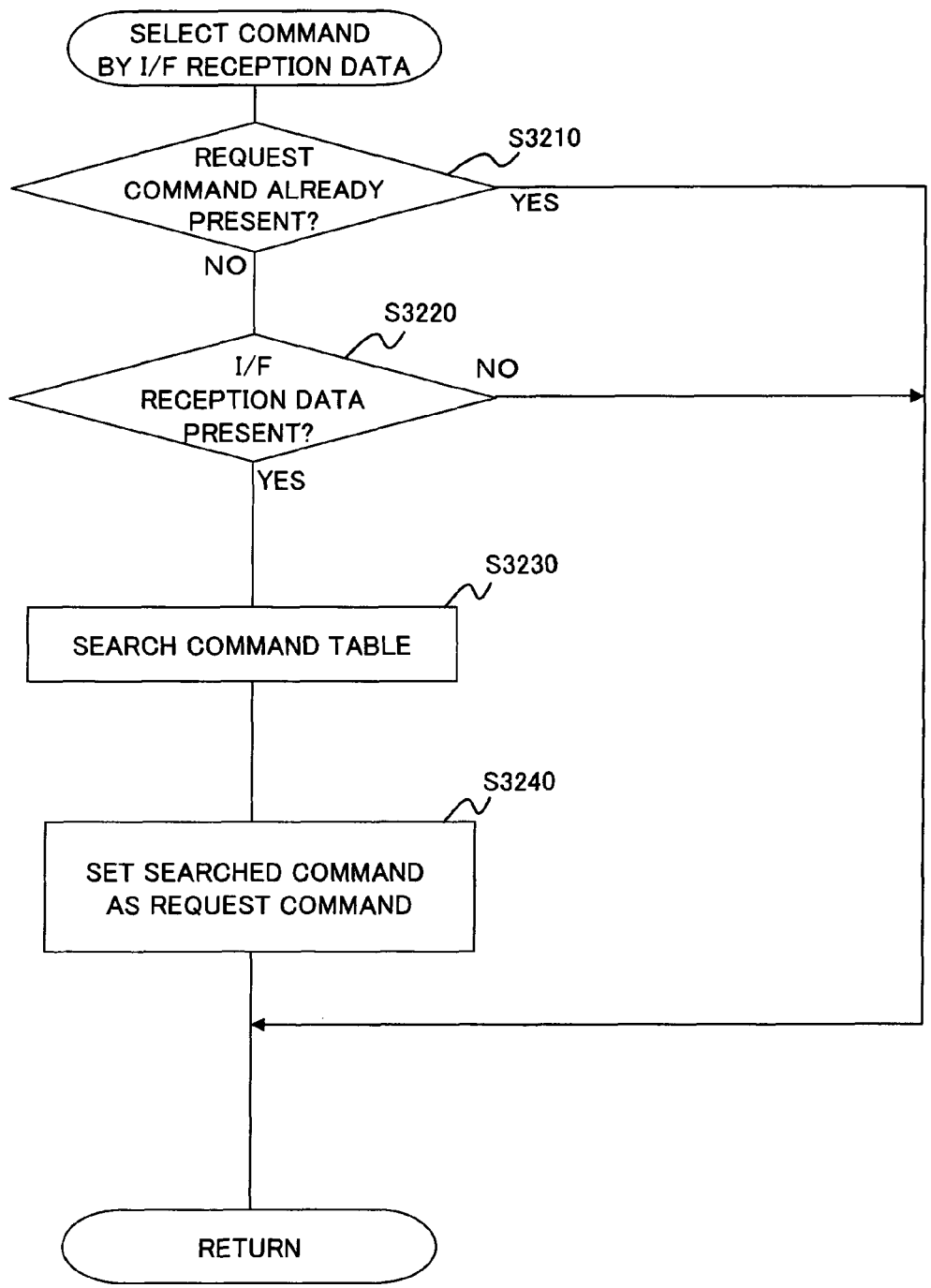

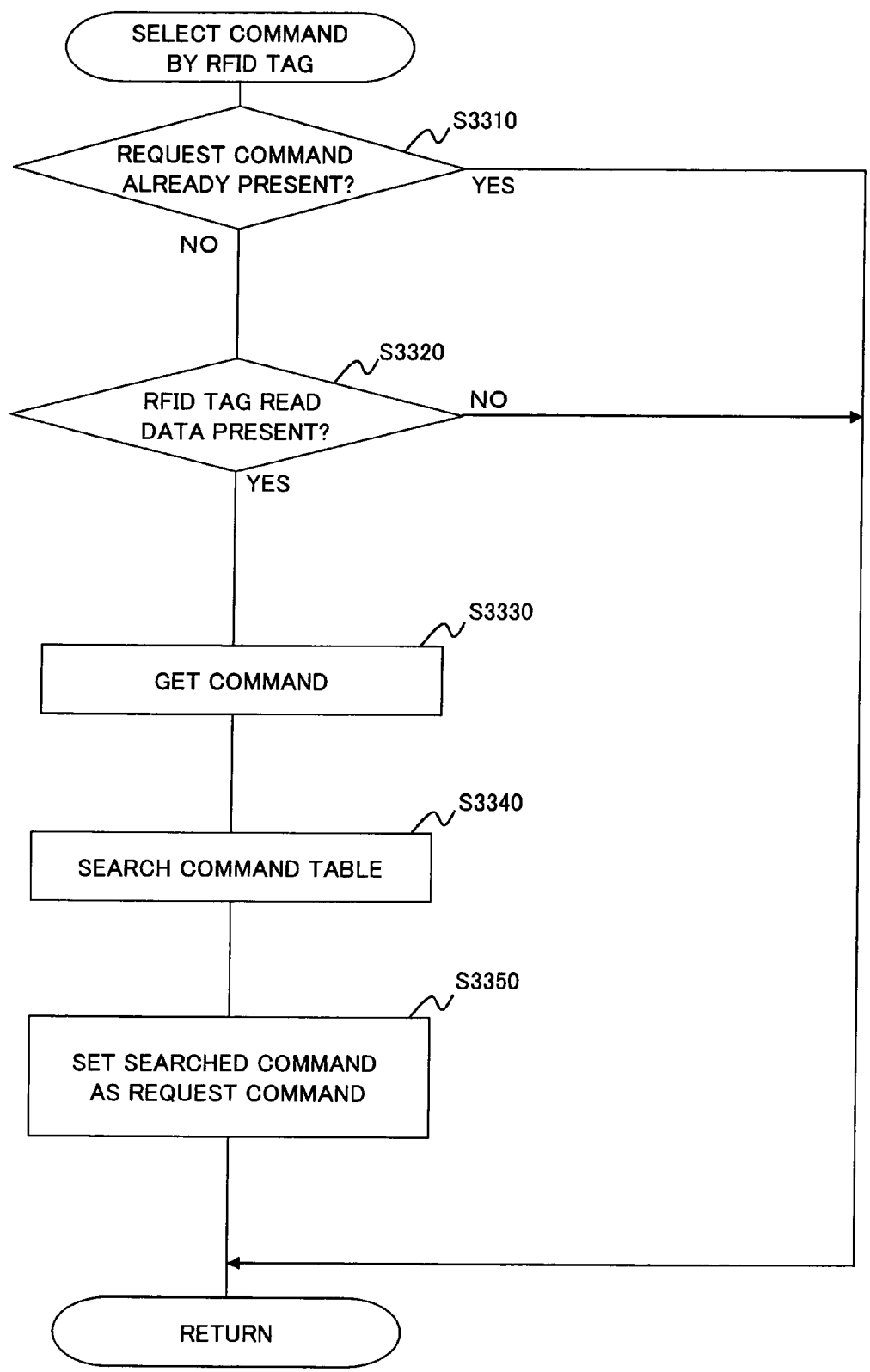
[FIG. 17]

[FIG. 18]
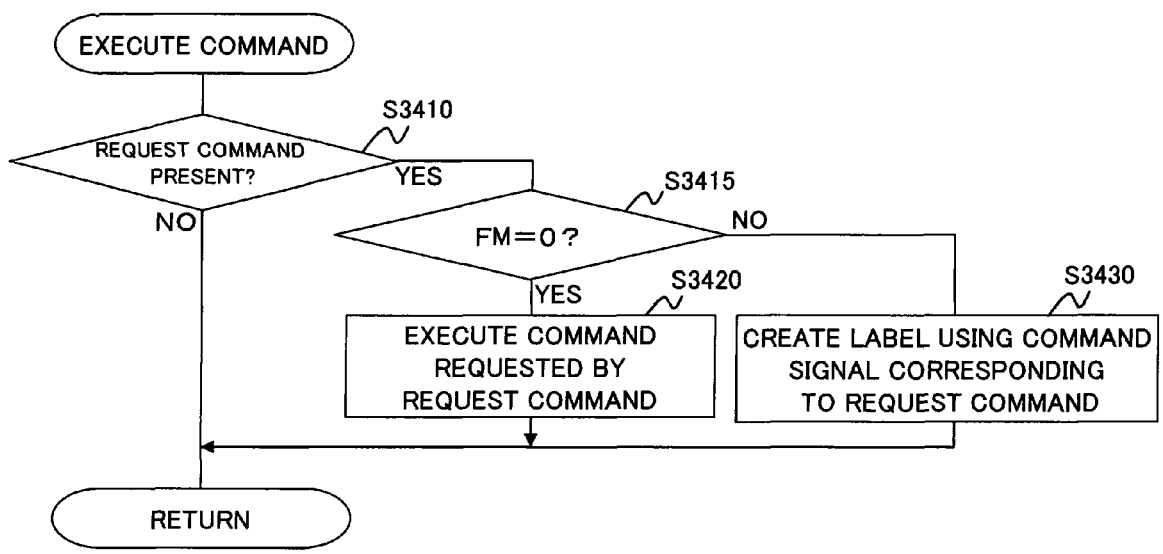

[FIG. 19]

| CONTENT OF REQUEST | I/F RECEIVE COMMAND | RFID TAG COMMAND | KEY DEPRESSION COUNT VALUE |
|---|---|---|---|
| DO NOTHING | 0 × 00 | 0 × 00 | 0 |
| CUT | 0 × 1B  TEST03 | 0 × 1B  TEST03 | 3 |
| HELP PRINT FUNCTION | 0 × 1B  HELP01 | 0 × 1B  HELP01 | 9 |
| MEDIUM INFORMATION PRINT FUNCTION | 0 × 1B  HELP02 | 0 × 1B  HELP02 | 10 |
| POWER OFF | 0 × 1B  P | 0 × 1B  P | — |
| ... | ... | ... | ... |

[FIG. 20A]
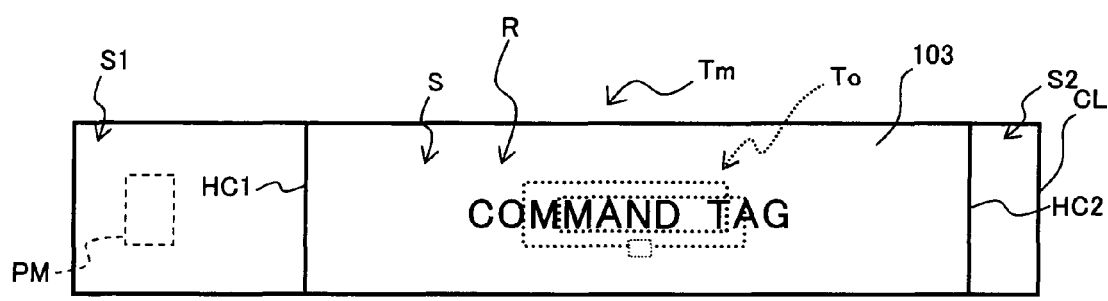
[FIG. 20B]
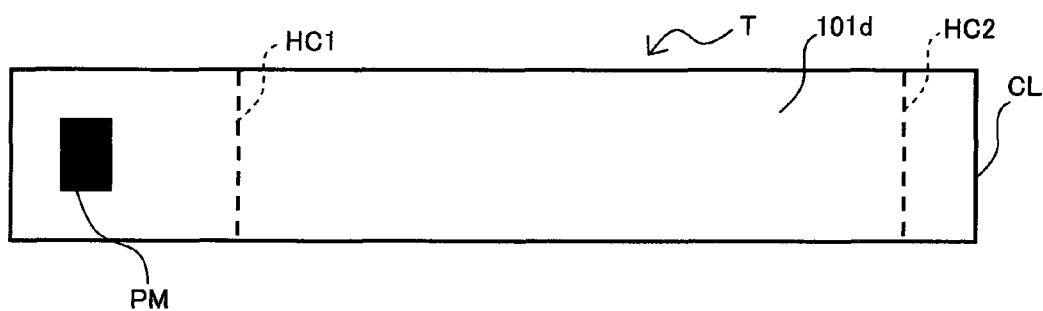

[FIG. 21]
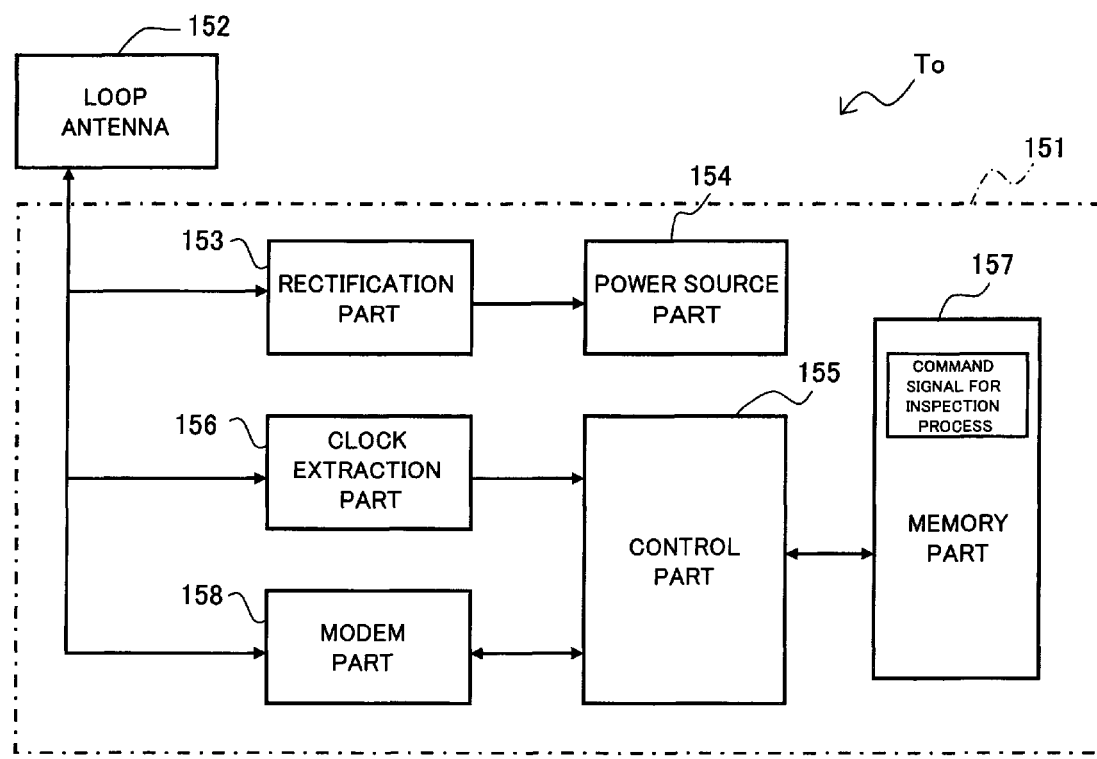

[FIG. 22]
```
KEY HELP
CUT KEY: FEEDS AND THEN CUTS TAPE.
POWER KEY: TURNS MAIN UNIT POWER ON AND OFF.
WARNING: DO NOT OPEN COVER DURING PRINTING.
```
[FIG. 23A]
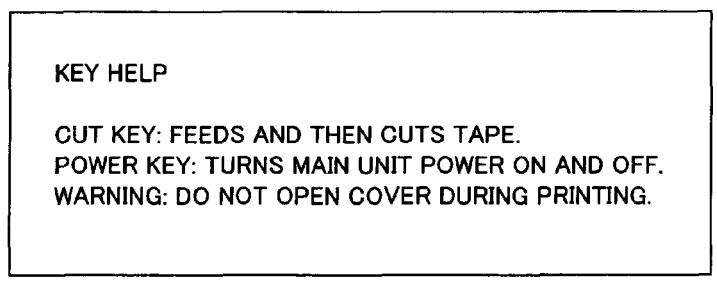
[FIG. 23B]
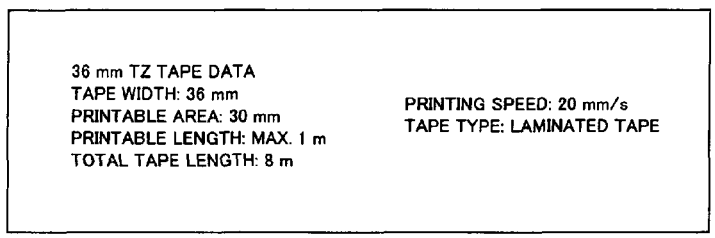

[FIG. 24]

| CONTENT OF REQUEST | I/F RECEIVE COMMAND | RFID TAG COMMAND | KEY DEPRESSION COUNT VALUE |
|---|---|---|---|
| DO NOTHING | 0x00 | 0x00 | 0 |
| CUT | 0x01B  TEST03 | 0x01B  TEST03 | 3 |
| HELP PRINT FUNCTION | 0x1B  HELP01 | 0x1B  HELP01 | 9 |
| MEDIUM INFORMATION PRINT FUNCTION | 0x1B  HELP02 | 0x1B  HELP02 | 10 |
| POWER OFF | 0x1B  P | 0x1B  P | — |
| WRITE RFID | 0x1B  TEST09 | 0x1B  TEST09 | — |
| READ RFID | 0x1B  TEST0A | 0x1B  TEST0A | — |
| RECEIVE PRINTING DATA | 0x1B  PD | 0x1B  PD | — |
| START PRINTING | 0x1B  PS | 0x1B  PS | — |
| SET PRINTING PARAMETERS | 0x1B  PP | 0x1B  PP | — |
| ALLOW EXECUTION OF COMMANDS BY RFID TAG | 0x1B  RFID00 | 0x1B  RFID00 | — |
| PROHIBIT EXECUTION OF COMMANDS BY RFID TAG | 0x1B  RFID01 | 0x1B  RFID01 | — |
| ... | ... | ... | ... |

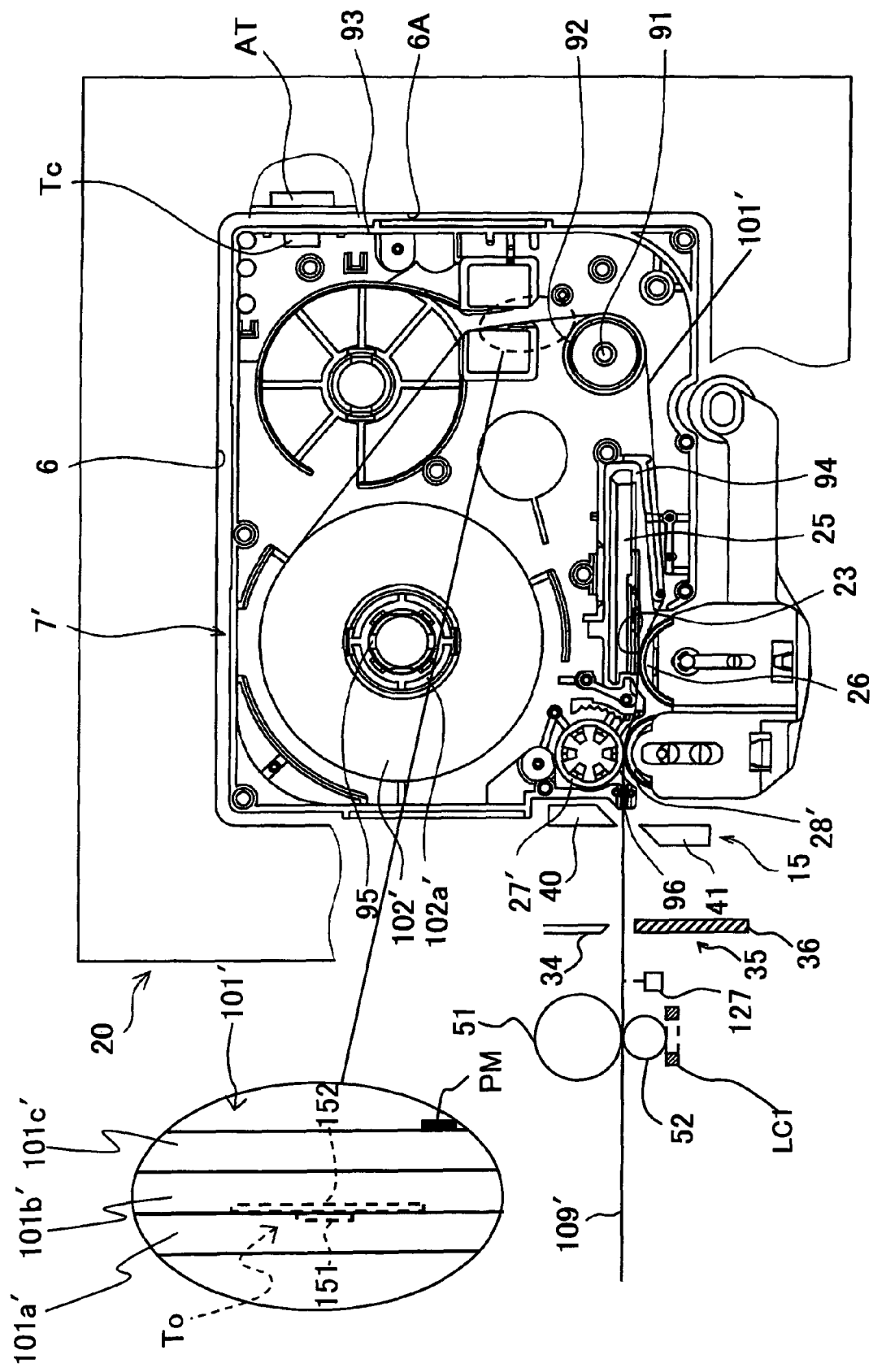
[FIG. 25]

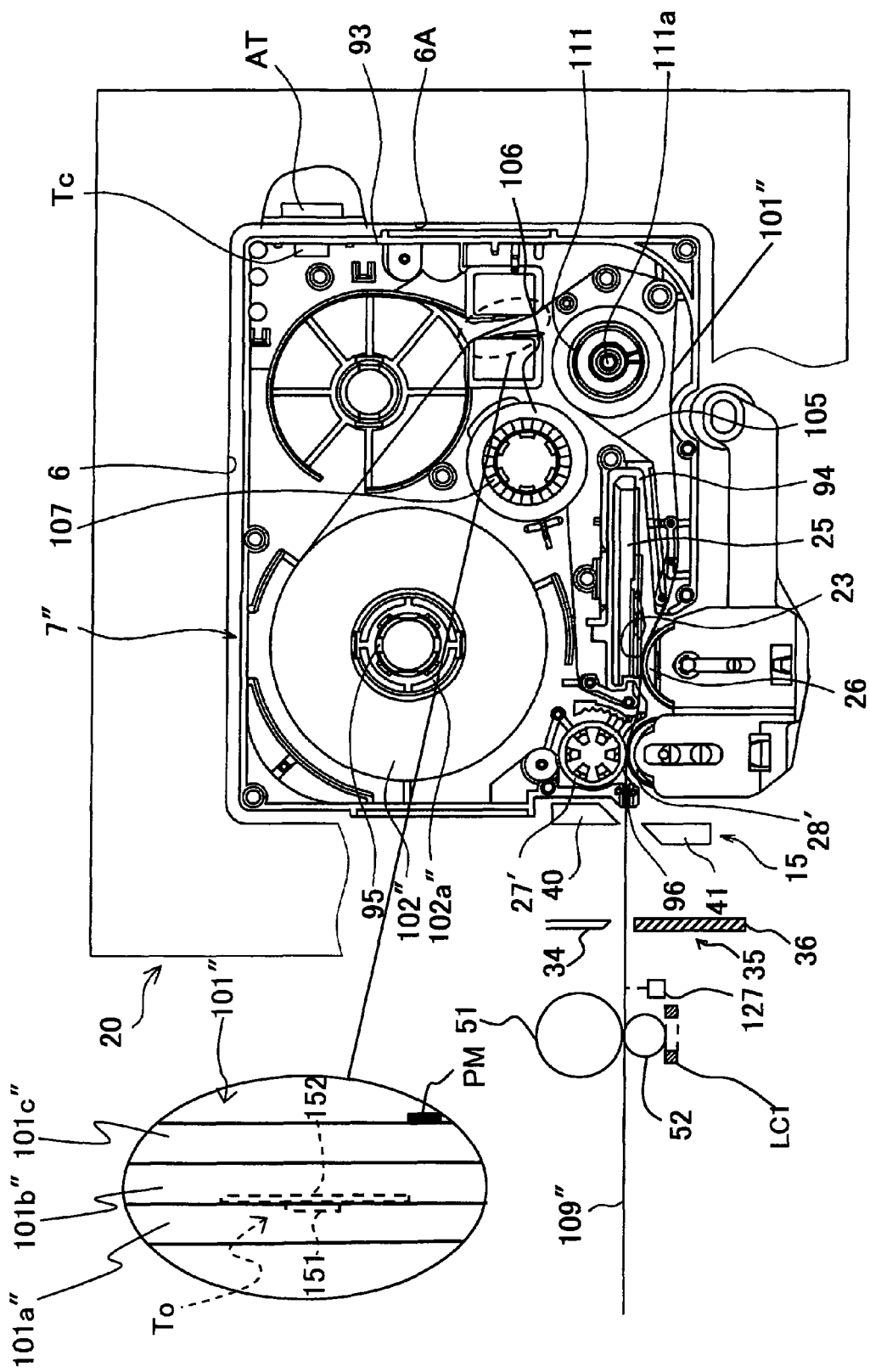
[FIG. 26]

RFID TAG PRODUCING APPARATUS

CROSS-REFERENCE TO RELATED APPLICATIONS

This application claims priority from JP 2007-201708, filed Aug. 2, 2007, the contents of which are hereby incorporated by reference.

BACKGROUND

1. Field

The present disclosure relates to an RFID tag producing apparatus for producing RFID tags capable of transmitting and receiving information to and from the outside.

2. Description of the Related Art

In the prior art, a label producing apparatus constituted so as to store a tape within a cartridge in the form of a roll and print desired text on the tape while the tape is fed out from the roll so as to produce a label has been proposed. (Refer to, for example, JP, A, 2005-254566, Paragraph [0100], FIG. 1, etc.).

With this prior art, the label producing apparatus comprises a roll around which a base tape comprising a separation sheet is wound, and a roll around which a print-receiving tape (cover film) to be bonded to this base tape is wound. The base tape and the print-receiving tape are respectively fed out from these two rolls while predetermined print is printed on the print-receiving tape. The printed print-receiving tape and the base tape are then bonded to each other so as to form a label tape with print. This label tape with print is subsequently cut to a predetermined length by a cutter, thereby producing a label.

At this time, an operation terminal is connected to the label producing apparatus via a wired network (communication line). The operator uses this operation terminal to provide operation instructions to operating devices (a print head, for example) provided to the label producing apparatus. A signal (print information, for example) corresponding to the operation instructions from the operator is read into the label producing apparatus via a communication line or an input/output interface. Then, based on the signal thus read, a control portion (a control circuit) controls the corresponding operating device so as to ensure that the device operates according to the operation instructions.

When the operator provides operation instructions to an operating device of the label producing apparatus to perform an operation by using the operation terminal outside the label producing apparatus as described above, a complex operation is sometimes required (using keys, buttons, and switches), depending on the content of the operation instructions. In such a case, it would be convenient if the operator could perform the same operation using a different, simpler means rather than the operation terminal, so as to reduce the operation labor of the operator. Nevertheless, the above-described prior art does not particularly take into consideration such a reduction in the labor burden of the operator.

SUMMARY

It is therefore an object of the present disclosure to provide an RFID tag producing apparatus capable of reducing the labor burden of the operator when the operator is to provide operation instructions to an operating device.

In order to achieve this object, an aspect of the present disclosure provides an RFID tag producing apparatus including a housing; a feeding device disposed inside the housing that feeds a tag medium, an RFID circuit element that comprises an IC circuit part that stores information and a tag antenna that transmits and receives information being arranged in the tag medium; a first antenna device disposed inside the housing, transmits and receives information via wireless communication to and from the RFID circuit elements of the tag medium fed by the feeding device; a writing control portion that writes a command signal for commanding operation of at least one operating device from among a plurality of operating devices including the feeding device and the first antenna device or information corresponding the command signal, to the IC circuit part of the RFID circuit element provided at the tag medium via the first antenna device so as to produce a command RFID tag; a second antenna device that transmits and receives information via wireless communication to and from the RFID circuit element of the command RFID tag disposed outside the housing, produced by the writing of the writing control portion, a reading control portion that acquires the command signal or information corresponding the command signal from the RFID circuit element via the second antenna device; and a device control portion, based on information obtained by the reading control portion, that controls the at least one operating device so as to perform the corresponding operations.

With the present disclosure, command RFID tags for causing various devices to perform various corresponding operations including an RFID tag producing operation (including maintenance, various types of testing and inspection, and so on as well) are produced, and information is read from the command RFID tags, thus making it possible to execute the various operations. In other words, when producing labels, the writing control portion writes a command signal (or a signal corresponding thereto) for commanding operation of at least one operating device, thus producing a command RFID tag. Wireless communication is performed with the command RFID tag (located outside the housing) thus produced via the second antenna device, and the command signal (or information corresponding thereto) is acquired from an RFID circuit element by reading control portion. The device control portion performs control based on the acquired information (using this in a case in which a command signal is acquired, or, in a case in which information corresponding to the command signal is acquired, using the command signal acquired separately based on this information), making it possible to cause the corresponding operating device to perform an operation in light with the command signal.

Thus, the command signal for giving an operation command to an operating device is acquired through wireless communication from a command RFID tag. As a result, it is possible to, for example, prepare RFID tags corresponding to various command signals, and to give commands through wireless communication using RFID tags corresponding to the content of the command for the desired operation. In this case, a convenient operation of causing an RFID tag to be read is sufficient, compared to a case in which a complex operation is required to issue a command using an operation terminal connected via wires. That is, the present disclosure does not require the operator to perform a complex operation using the keys, buttons, and switches of the operation terminal, thereby reducing the operation labor of the operator.

In the present disclosure, it is possible to produce the command RFID tags used to reduce the amount of operation labor. In other words, since there is no need to prepare another separate device for producing command RFID tags, it is possible to improve the convenience of the operator even further.

BRIEF DESCRIPTION OF THE DRAWING

FIG. 1 is a system configuration diagram illustrating a label manufacturing system comprising the label producing apparatus of an embodiment of the present disclosure.

FIG. 2 is a perspective view which shows the overall structure of the label producing apparatus.

FIG. 3 is an oblique view which shows the structure (with loop antennas omitted) of the internal modules within the label producing apparatus.

FIG. 4 is a plan view which shows the structure of the internal modules shown in FIG. 3.

FIG. 5 is an enlarged plan view schematically showing the detailed structure of a cartridge.

FIG. 6 is a functional block diagram which shows the control system of the label producing apparatus of the present embodiment.

FIG. 7 is a functional block diagram which shows the functional configuration of an RFID circuit element for label production or information acquisition.

FIG. 8 is a flowchart showing the control content executed by a control circuit of the label producing apparatus when an RFID label or ordinary label is produced in the label manufacturing system.

FIG. 9 is a flowchart which shows the detailed procedure of step S200.

FIG. 10 is a flowchart which shows the detailed procedure of step S400.

FIG. 11 is a flowchart which shows the detailed procedure of step S300.

FIGS. 12A and 12B are a top view and a bottom view illustrating an example of the outer appearance of an RFID label formed after information has been written to (or read from) the RFID circuit element for label production and the tag label tape with print has been cut based on such control as described above.

FIGS. 13A and 13B are a diagram in which the cross-sectional view of the cross-section XIIIA-XIIIA' in FIG. 12A is rotated 90° in the counter-clockwise direction, and a diagram in which the cross-sectional view of the cross-section XIIIB-XIIIB' in FIG. 12A is rotated 90° in the counter-clockwise direction.

FIG. 14 is a flow chart showing a control procedure for an inspection process executed by the control circuit provided to the label producing apparatus, at the time the inspection is executed.

FIG. 15 is a flow chart illustrating in detail a procedure in step S3100 in FIG. 14.

FIG. 16 is a flow chart illustrating in detail a procedure in step S3200 in FIG. 14.

FIG. 17 is a flow chart illustrating in detail a procedure in step S3300 in FIG. 14.

FIG. 18 is a flow chart illustrating in detail a procedure in step S3400 in FIG. 14.

FIG. 19 is a diagram illustrating an example of a command table.

FIGS. 20A and 20B are outer appearance diagrams illustrating an example of an RFID tag comprising an RFID circuit element for information acquisition and correspond to FIG. 12A and FIG. 12B.

FIG. 21 is a functional block diagram which shows the functional configuration of an RFID circuit element of an inspection tag, and corresponds to the FIG. 7.

FIG. 22 is a diagram illustrating a printing example of a printed item (the ordinary label or the RFID label, for example) when "Print HELP" command shown in FIG. 19 is executed.

FIG. 23 is a diagram illustrating a printing example of a printed item (the ordinary label or the RFID label, for example) when "Print media information" command shown in FIG. 19 is executed.

FIG. 24 is a diagram illustrating a command table that includes other examples of common commands.

FIG. 25 is a plan view showing a detailed structure of a cartridge according to a non-laminated type modification, and corresponds to the aforementioned FIG. 5.

FIG. 26 is a plan view showing a detailed structure of a cartridge according to another non-laminated type modification, and corresponds to the FIG. 25 and the FIG. 5.

DETAILED DESCRIPTION OF THE PREFERRED EMBODIMENTS

An embodiment of the present disclosure is described below with reference to the drawings.

In a label manufacturing system LS shown in FIG. 1, a label producing apparatus 1 in the present embodiment is connected to a PC 118 via a communication line NW which is either wired or wireless. The PC 118 comprises a display part 118a such as a liquid crystal display, and an operation part 118b such as a keyboard and mouse, making it possible to edit the print content when producing a label (i.e., an RFID label T or an ordinary label L) using the label producing apparatus 1.

The label producing apparatus 1, as shown in FIG. 2, produces an RFID label T with print using a base tape comprising an RFID circuit element To (hereinafter, suitably referred to as "RFID circuit element To for label production") in the apparatus, produces an ordinary label L using an ordinary base tape not comprising an RFID circuit element To, and reads (acquires) information from the RFIC circuit element To (hereinafter suitably referred to as "RFID circuit element To for information acquisition") from outside the apparatus, based on the operation from the PC 118. Moreover, as a feature of the present embodiment, the present embodiment is able to produce its own RFID labels T (i.e., command tags Tm; discussed below in greater detail and described in FIG. 20) provided with RFID circuit elements To for information acquisition (discussed in detail below).

The label producing apparatus 1 comprises an apparatus main body 2 having a housing 200 of a substantially six-sided (substantially cubical) shape, and an opening/closing lid 3 provided on the upper surface of the apparatus main body 2 so as to freely open and close (or detach).

The housing 200 of the apparatus main body 2 comprises a front wall 10, which is positioned at the front of the apparatus (the left front side in FIG. 2) and comprises a label discharging exit 11 configured to discharge an RFID label T (described later) produced within the apparatus main body 2, and a front lid 12 with a rotationally supported bottom edge that is provided below the label discharging exit 11 of the front wall 10.

The front lid 12 comprises a pressing part 13, which is designed to release the front lid 12 forward when pressed upward. Further, on one edge of the front wall 10 is provided a power key 14 that turns the power source of the label producing apparatus 1 on and off. Below this power key 14 is provided a cutter driving key 90 configured to drive a cutting mechanism 15 (refer to FIG. 3 described later) disposed within the apparatus main body 2 based on a manual operation performed by the operator.

The opening/closing lid 3 is rotatably supported by a shaft at the edge of the right rear side of FIG. 2 of the apparatus main body 2, and is always biased in the release direction via a biasing member of a spring, etc. The opening/closing lid 3 and apparatus main body 2 are unlocked by the pressing of an opening/closing button 4 disposed adjacent to the opening/closing lid 3 on the upper surface of the apparatus main body 2, and released by the action of the biasing member. Furthermore, in the center side area of the opening/closing lid 3 is provided an inspection window 5 covered by a transparent cover.

As shown in FIG. 3, the internal module 20 generally comprises a cartridge holder 6 configured to house a cartridge 7, a printing mechanism 21 comprising a print head (thermal head) 23, the cutting mechanism 15 comprising a fixed blade 40 and a movable blade 41, and a half-cutting module 35, which comprises a half-cutter 34 and is positioned downstream in the tape feeding direction from the fixed blade 40 and the movable blade 41.

On the upper surface of the cartridge 7 is provided a tape identifying display part 8 configured to display the tape width, tape color, etc., of a base tape 101 built into the cartridge 7, for example. On the cartridge holder 6, a roller holder 25 is rotatably pivoted by a support shaft 29 and is designed so as to be switchable to a print position (contact position; refer to FIG. 4 described later) or to a release position (break away position) by a switching mechanism. On this roller holder 25 are rotatably provided a platen roller 26 and a tape pressure roller 28. When the roller holder 25 switches to the print position, the platen roller 26 and the tape pressure roller 28 press against the print head 23 and a feeding roller 27.

The print head 23 comprises a great number of heating elements, and is installed on a head installation part 24 established on the cartridge holder 6.

The cutting mechanism 15 comprises a fixed blade 40 and a movable blade 41 constructed using a metal material. The driving power of a cutter motor 43 (refer to FIG. 6 described later) is transmitted to a handle part 46 of the movable blade 41 via a cutter helical gear 42, a boss 50, and a long hole 49, causing the movable blade to rotate and perform cutting with the fixed blade 40. The switching status is detected by a micro switch 126 configured to switch based on the action of a cam 42A for the cutter helical gear.

The half-cutting module 35 is disposed opposite a receiving tray 38 and the half-cutter 34, and a first guide part 1 and a second guide part 44 are installed on a side plate 44 (refer to FIG. 4 described later) by a guide fixing part 36A. The half-cutter 34 is rotated by a rotating force of a half-cutter motor 129 (refer to FIG. 6 described later) around a predetermined rotating support point (not shown). On the edge of the receiving tray 38 is formed a receiving surface 38B.

As shown in FIG. 4, the cartridge holder 6 houses the cartridge 7 so that the orientation of the width direction of a label tape 109 with print discharged from a tape discharging part 30 of the cartridge 7 and further discharged from the discharging exit 11 is set in the vertical direction.

Further, a label discharge mechanism 22, a loop antenna LC1 for label production, and a loop antenna LC2 for information acquisition are provided to the internal module 20.

The loop antenna LC1 for label production comprises a communicable area on the inner side of the housing 200, and is configured to receive and transmit information from and to an RFID circuit element To for label production provided in the label tape 109 with print. The loop antenna LC2 for information acquisition comprises a communicable area on the outer side of the housing 200, and is configured to transmit and receive information from and to an RFID circuit element To for information acquisition positioned outside the housing 200. Then, between the loop antenna LC1 for label production and the loop antenna LC2 for information acquisition is provided a metal shield member 85, for example, configured to block magnetic flux produced from these loop antennas LC1 and LC2.

The label discharging mechanism 22 discharges the label tape 109 with print (in other words, the RFID label T; hereinafter the same) cut by the cutting mechanism 15 from the label discharging exit 11 (refer to FIG. 2). That is, the label discharging mechanism 22 comprises a driving roller 51 configured to rotate by the driving power of a tape discharging motor 123 (refer to FIG. 6 described later), a pressure roller 52 disposed opposite the driving roller 51 across from the label tape 109 with print, and a mark sensor 127 configured to detect an identification mark PM (refer to FIG. 5 described later) provided on the label tape 109 with print. At this time, on the inside of the label discharging exit 11 are provided first guide walls 55 and 56 and second guide walls 63 and 64 configured to guide the label tape 109 with print to the label discharging exit 11 and the loop antenna LC1 for label production. The first guide walls 55 and 56 and the second guide walls 63 and 64 are each formed into an integrated unit and disposed so that they are separated at predetermined intervals at the discharging location of the label tape 109 with print (RFID label T) cut by the fixed blade 40 and the movable blade 41.

Furthermore, a feeding roller driving shaft 108 and a ribbon take-up roller driving shaft 107 provide feeding driving power to the label tape 109 with print and an ink ribbon 105 (described below), and are rotationally driven in coordination.

As shown in FIG. 5, the cartridge 7 comprises a housing 7A, a first roll 101 (actually spiral in shape, but simply shown in a concentric shape in the figure), around which the strip base tape 102 is wound, and which is disposed within the housing 7A, a second roll 103 (actually spiral in shape, but simply shown in a concentric shape in the figure), around which a transparent cover film 104 is wound, with approximately the same width as that of the base tape 101, a ribbon supply side roll 211 configured to supply the ink ribbon 105 (heat transfer ribbon, which is not required in a case of employing a thermal tape as the print-receiving tape), a ribbon take-up roller 105 configured to rewind the ribbon 105 after the printing, and the feeding roller 27 rotatably supported near the tape discharging part 30 of the cartridge 7.

The feeding roller 27 is configured to affix the base tape 101 and the cover film 103 to each other by applying pressure and transport the label tape 109 with print thus formed in the direction of the arrow A in FIG. 5 (i.e. functioning as a pressure roller as well).

The first roll 102 holds the base tape 101, wound around the reel member 102a, in which the plurality of RFID circuit elements To for label production are sequentially disposed at predetermined regular intervals (a fixed pitch) in a lengthwise direction. In this example, the base tape 101 has a four-layer structure (refer to the partially enlarged view in FIG. 5) comprising an adhesive layer 101a formed of a suitable adhesive material, a colored base film 101b formed of PET (polyethylene terephthalate) or the like, an adhesive layer 101c formed of a suitable adhesive material, and a separation sheet 101d. The four layers of the base tape 101 are layered in that order from the side rolled to the inside (the right side in FIG. 5) to the side corresponding to the opposite side (the left side in FIG. 5).

A loop antenna 152 configured to transmit/receive information and constructed in a loop coil shape is provided on the back side of the base film 101b (on the left side in FIG. 5) in an integrated manner in this example, and an IC circuit part 151 configured to store information is formed so that it is connected to the loop antenna 151, thereby constructing an RFID circuit element To.

The adhesive layer 101a for adhering to the cover film 103 at a later time is formed on the front side of the base film 101b (on the right side in FIG. 5). Furthermore, the separation sheet 101d is adhered to the back side (on the left side of FIG. 5) of the base film 101b by the adhesive layer 101c provided so as to contain the RFID circuit element To for label production.

Note that the separation sheet 101d is peeled off when the RFID label T is adhered as a finished label-like product to a predetermined article or the like, thereby adhering the RFID label T to the article or the like by the adhesive layer 101c. A predetermined identification mark (a black identification mark in this example; a hole punched in the base tape 101 by laser processing, etc., or a hole finished using a Thompson mold is also possible) PM for feeding control is provided in advance in a predetermined location (a location farther forward than the front end of the loop antenna 152 on the forward direction side of the feeding direction in this example) corresponding to each RFID circuit element To for label production on the front surface of the separation sheet 101d. Note that the identification mark PM may be provided on the cover film 103 (on a thermal tape 101' or a base tape 101" in the modification described later), and detected using the same sensor as the mark sensor 127 so as to achieve the same feeding control, positioning control, cutting control, printing control, etc.

The second roll 104 holds the cover film 103 wound around a reel member 104a. The cover film 104 fed out from the second roll 104 is pressed against the ribbon 106 driven by the ribbon supply side roll 211 and the ribbon take-up roller 105, which are disposed inward from the back side of the cover film 103 (i.e., the side of the cover film 103 which is affixed to the base tape 101), by the print head 23, such that the ribbon 105 is brought into close contact with the back side of the cover film 103.

The ribbon take-up roller 106 and the feeding roller 27 are rotationally driven in coordination by a driving power of a feeding motor 119 (refer to FIG. 3 and FIG. 6 described later), which is a pulse motor, for example, provided on the outside of each cartridge, that is transmitted to the ribbon take-up roller driving shaft 107 and the tape feeding roller driving shaft 108 via a gear mechanism (not shown).

In the configuration described above, the base tape 102 fed out from the first roll 102 is supplied to the feeding roller 27. The cover film 104 fed out from the second roll 104, in turn, is pressed against the ink ribbon 106 driven by the ribbon supply side roll 211 and the ribbon take-up roller 105, which are disposed inward from the back side of the cover film 103 (i.e., the side of the cover film 103 which is affixed to the base tape 101), by the print head 23, such that the ink ribbon 105 is brought into close contact with the back side of the cover film 103.

Then, when the cartridge 7 is loaded to the cartridge holder 6, and the roll holder 25 is moved from the release position to the print position, the cover film 103 and the ink ribbon 105 are sandwiched between the print head 23 and the platen roller 26, while the base tape 101 and the cover film 103 are sandwiched between the feeding roller 27 and the pressure roller 28. Subsequently, the ribbon take-up roller 106 and the feeding roller 27 are synchronously rotationally driven along the directions denoted by the arrow B and the arrow C, respectively, in FIG. 5 by the driving force provided from the feeding motor 119. Furthermore, the tape feeding roller driving shaft 108, the pressure roller 28, and the platen roller 26 are connected to one another by a gear mechanism (not shown). With such an arrangement, upon driving the tape feeding roller driving shaft 108, the feeding roller 27, the pressure roller 28, and the platen roller 26 rotate, thereby feeding out the base tape 102 from the first roll 102 to the feeding roller 27 as described above. On the other hand, the cover film 104 is fed out from the second roll 104, and a plurality of heating elements of the print head 23 are powered by a print-head driving circuit 120 (refer to FIG. 6 described later). As a result, printing is performed, thereby forming the print R (refer to FIG. 12 described later), which corresponds to the RFID circuit element To for label production on the base tape 101 that is to be bonded, on the back side of the cover film 103. Then, the base tape 101 and the printed cover film 103 are affixed to each other by the feeding roller 27 and the pressure roller 28 so as to form a single tape, thereby forming the label tape 109 with print, which is then transported to outside the cartridge 7 by the tape discharging part 30 (refer to FIG. 4). Subsequently, the ribbon take-up roller driving shaft 107 is driven to take up the ink ribbon 105, which has been used to print the print on the cover film 103, onto the ribbon take-up roller 106.

The housing 7A of the cartridge 7 comprises a detected part 190 (an identifier of a bumpy shape, for example), and a cartridge sensor 81 is provided at the location corresponding to the detected part 190 of the cartridge holder 6. The cartridge sensor 81 detects the mounted state of the cartridge 7 and also detects the cartridge information (tape attribute information) related to the type of the cartridge 7. A control circuit 110 (see FIG. 6 discussed below) is able to acquire information on the cartridge as well as whether the cartridge 7 is mounted or not with a detection signal of the cartridge sensor 81 being input to the control circuit 110. Moreover, the cartridge information includes information such as on the tape width of the base tape 101 (the cover film 103), and whether or not RFID circuit elements To are attached to the base tape 101. Further, if the base tape 101 has RFID circuit elements To, the arrangement interval (hereafter referred to as "tag pitch" as appropriate) of the RFID circuit elements To in the base tape 101, the arrangement position, and other information are also included.

The detection sensor 81 which is used is, for example, a sensor that performs mechanical detection such as a mechanical switch, a sensor that performs optical detection, or a sensor that performs magnetic detection. Note that a cartridge RFID circuit element may be provided in the housing 7A of the cartridge 7, and the RFID tag information may be read via wireless communication using a detection sensor comprising a reader function.

Then, after the information of the label tape 109 with print bonded and produced as described above is read and written to the RFID circuit element To for label production by the loop antenna LC1 for label production, the label tape 109 with print is cut by the cutting mechanism 15 either automatically or by operating the cutter driving key 90 (refer to FIG. 2), thereby forming the RFID label T. This RFID label T is subsequently discharged from the label discharging exit 11 (refer to FIG. 2 and FIG. 4) by the label discharging mechanism 22.

Note that while the above described in detail the structure of the tag cartridge for producing an RFID label T comprising an RFID circuit element To, the same structure as that of the tag cartridge, excluding the point that the base tape does not comprise an RFID circuit element To, is used for the structure of a regular cartridge for producing an ordinary label L not comprising an RFID circuit element To. The following describes a case where an ordinary label is produced using a regular cartridge, using the same reference numerals as those for each part of the tag cartridge. Note that with the regular cartridge the identification mark PM of the base tape, cover film, etc., may be omitted. In such a case, the same feeding control, positioning control, cutting control, printing control, etc., may be performed using as a reference at the start of label production the full-cut position (or the resultant position after the tape has been fed a distance of a predetermined margin from the full-cut position) used at the time of the previous label production.

A control system of the label producing apparatus 1 in the embodiment is shown in FIG. 6. Note that the arrow shown in the figure denotes an example of signal flow, but the signal flow direction is not limited thereto.

In FIG. 6, the control circuit 110 is disposed on a control board (not shown) of the label producing apparatus 1.

The control circuit 110 is provided with a CPU 111 for controlling various devices, an input/output interface 113 connected via a data bus 112 to the CPU 111, a CGROM 114, ROMs 115 and 116, and a RAM 117.

The ROM 116 stores a print-head driving control program configured to read print buffer data in accordance with an operation input signal from the PC 119 so as to drive the print head 23, the feeding motor 119, and the tape discharging motor 65; a cutting driving control program configured to drive the cutter motor 43 so as to cut the label tape 109 with print; a tape discharging program configured to drive the tape discharging motor 65 so as to forcibly discharge the cut label tape 109 with print (i.e., the RFID label T) from the label discharging exit 11; a transmission program configured to generate and output to a transmission circuit access information such as an inquiry signal or write signal for the RFID circuit element To for label production or for information acquisition; a reception program configured to process response signals and the like input from a reception circuit; and various other programs required for controlling of the label producing apparatus 1. The CPU 111 performs various operations based on each such program stored in the ROM 116.

The RAM 117 is provided with a text memory 117A, a print buffer 117B, a parameter storage area 117E, and so on. Text data input from the PC 118 is stored in the text memory 117A. The print buffer 117B stores a plurality of dot patterns for printing letters and symbols as well as the number of applied pulses, i.e., the amount of energy for forming each dot, as dot pattern data, and the print head 23 performs dot printing according to the dot pattern data stored in the print buffer 117B. The parameter storage area 117E stores information such as various operation data and the (previously described) read (acquired) tag identification information (tag ID) of the RFID circuit element To for information acquisition.

The input/output interface 113 connects to the PC 119, the print-head driving circuit 120 configured to drive the print head 23, a feeding motor driving circuit 121 configured to drive the feeding motor 119, a cutter motor driving circuit 122 configured to drive the cutter motor 43, a half-cutter motor driving circuit 128 configured to drive the half-cutter motor 129, the tape discharging motor driving circuit 123 configured to drive the tape discharging motor 65, a transmission circuit 306 configured to generate a carrier wave for accessing (reading from and writing to) the RFID circuit element To for label production or information acquisition via the loop antennas LC1 and LC2 and modulate the carrier wave based on the control signal input from the control circuit 110 so as to output an interrogation wave, a reception circuit 307 configured to demodulate the response wave received from the RFID circuit element To for label production or information acquisition via loop antennas LC1 and LC2 and output the demodulated response wave to the control circuit 110, the mark sensor 127 configured to detect the identification mark PM, the cartridge sensor 81 configured to detect the loaded state of the cartridge 7, and the cutter driving key 90.

The transmission circuit 306 and the reception circuit 307 are connected to the loop antennas LC1 and LC2 via an antenna sharing device 240 and a switching circuit 86. The switching circuit 86 performs switching based on a control signal from the control circuit 110 so as to connect the antenna sharing device 240 to the loop antenna LC1 for label production or the loop antenna LC2 for information acquisition. Specifically, the control circuit 110 controls the switching circuit 86 so as to connect the antenna sharing device 240 and the loop antenna LC1 for label production when an RFID label T is produced, and to connect the antenna sharing device 240 and the loop antenna LC2 for information acquisition when information is read from an external RFID circuit element To for information acquisition.

In such a control system with the control circuit 110 at its core, when character data and the like are input via the PC 119, the text (text data) is successively stored in the text memory 117A, the print head 23 is driven via the driving circuit 120 and each heating element is selectively exothermically driven according to the print dots of one line so as to print the dot pattern data stored in the print buffer 117B, while the feeding motor 119 synchronously controls the feeding of the tape via the driving circuit 121. The transmission circuit 306 controls the modulation of the carrier wave based on a control signal from the control circuit 110 and outputs an interrogation wave, and the reception circuit 307 processes the demodulated signal based on a control signal from the control circuit 110.

The functional configuration of the RFID circuit element To for label production or information acquisition is shown in FIG. 7. Note that the arrow shown in the figure denotes an example of signal flow, but the signal flow direction is not limited thereto.

In FIG. 7, the RFID circuit element To for label production or information acquisition comprises the loop antenna 152 configured to transmit/receive signals in a non-contact manner by magnetic induction with the loop antennas LC1 and LC2 of the label producing apparatus 1, and the IC circuit part 152 connected to the loop antenna 151.

The IC circuit part 151 comprises a rectification part 153 for rectifying the interrogation waves received via the antenna 152, a power source part 154 for storing the energy of the interrogation waves rectified by the rectification part 153, which serves as a driving power supply, a clock extraction part 156 for extracting clock signals from the interrogation waves received by the loop antenna 152 and supplying the clock signals thus extracted to a control part 155, a memory part 157 capable of storing predetermined information signals, a modem part 158 connected to the antenna 152, and the control part 155 for controlling the operation of the RFID circuit element To via the memory part 157, the clock extraction part 156, the modem part 158, and so on.

The modem part 158 demodulates communication signals from the loop antennas LC1 and LC2 of the label producing apparatus 1 received from the loop antenna 152, modulates a reply signal from the control part 155, and replies with a response wave from the loop antenna 152.

The control part 155 executes basic control, such as interpreting a received signal demodulated by the modulator/demodulator part 158, generating a response signal based on the information signal stored in the memory part 157, and returning the response signal from the modulator/demodulator part 158.

In order to carry out the above controls, the control procedure shown in FIG. 8 is executed by the control circuit 110 of the label producing apparatus 1 when an RFID label T is produced. Note that the control circuit 110 starts the flow when, for example, the operator enters a suitable operation that instructs the system to start tag label editing on the PC 118, and that operation signal is input from the PC 118.

First, in step S105, a preparatory process is executed. Specifically, an operation signal is entered from the PC 118 (via the communication line NW and the input/output interface 113), and based on this operation signal, the print data, the tag writing data, the half-cut position (the position on the half-cut line), the full-cut position (the position on the cut line CL), the printing stop position, and so on are set.

Next, in step S110, in a case where there is no response from the RFID circuit element To for label production when communication is performed from the loop antenna LC1 for label production to the RFID circuit element To for label production, variables M and N for counting the number of communication retries (the access retry count) are initialized to 0 (refer to FIG. 10 described later).

Subsequently, the flow proceeds to step S115, wherein a control signal is output to the feeding motor driving circuit 121 via the input/output interface 113, and the feeding roller 27 and the ribbon take-up roller 106 are rotationally driven by the driving force of the feeding motor 119. Furthermore, a control signal is output to the tape discharging motor 65 via the tape discharging motor driving circuit 123, and the driving roller 51 is rotationally driven. With this arrangement, the base tape 102 is fed out from the first roll 102 and supplied to the feeding roller 27, the cover film 104 is fed out from the second roll 103, and the base tape 101 and the cover film 103 are affixed to each other by the feeding roller 27 and the sub-roller 109 so as to form a single tape, thereby forming the label tape 109 with print, which is then transported.

Next, in step S120, the judgment is made as to whether or not the identifier PM of the base tape 101 has been detected (in other words, whether or not the cover film 103 has reached the print start position of the print head 23), based on the detection signal of the mark detection sensor 127 input via the input/output interface 113. This step is repeated until the identifier PM is detected and, once the identifier PM is detected, the judgment is made that the condition is satisfied, and the flow proceeds to the next step S125.

In step S125, a control signal is output to the print-head driving circuit 120 via the input/output interface 113, power is supplied to the print head 23, and printing of the label printing R, being letters, symbols, bar codes, and the like, is begun in a print area S on the cover film 103.

Subsequently, in step S130, the judgment is made as to whether or not the label tape 109 with print has been fed to the previously set front half-cut position (in other words, whether or not the label tape 109 with print has reached the position where the half-cutter 34 of the half-cutting module 35 is in front of the front half-cut line HC1). This judgment may be made by detecting, for example, the transported distance after the identifier PM of the base tape 101 has been detected in the step S120, using a predetermined known method (by counting, for example, the number of pulses output by the feeding motor driving circuit 121 configured to drive the feeding motor 119, which is a pulse motor).

This step is repeated until the label tape 109 with print reaches the front half-cut position and, once the label tape 109 with print reaches the front half-cut position, the judgment is made that the condition has been satisfied in step S130, and the flow proceeds to the next step S135.

In step S135, a control signal is output to the feeding motor driving circuit 121 and the tape discharging motor driving circuit 123 via the input/output interface 113 so as to stop the driving of the feeding motor 119 and the tape discharging motor 65, thereby stopping the rotation of the feeding roller 27, the ribbon take-up roller 106, and the driving roller 51. With this arrangement, in the process wherein the label tape 109 with print fed out from the cartridge 7 is moved in the discharging direction, the feeding of the base tape 101 from the first roll 102, the feeding of the cover film 103 from the second roll 104, and the transport of the label tape 109 with print are stopped with the half-cutter 34 of the half-cutting module 35 at the front half-cut position determined in step S105. At this time, a control signal is also output to the print-head driving circuit 120 via the input/output interface 113 so as to stop the power supply to the print head 23, thereby stopping the printing of the above-described label print R.

Next, in step S140, a control signal is output to the half-cutter motor driving circuit 128 via the input/output interface 113 so as to drive the half-cutter motor 129 and rotate the half-cutter 34, thereby cutting the cover film 103, the adhesive layer 101a, the base film 101b, and the adhesive layer 101c of the label tape 109 with print and perform the front half-cutting which forms the front half-cut line HC1.

Then, the flow proceeds to step S145 and, as in step S115, the feeding roller 27, the ribbon take-up roller 106, and the driving roller 51 are rotationally driven so as to resume the transport of the label tape 109 with print, and, as in step S125, power is supplied to the print head 23 so as to resume the printing of the label print R.

Next, in step S147, a judgment is made as to whether the cartridge 7 mounded on the cartridge holder 6 is a tag cartridge having RFID circuit elements To or is an ordinary cartridge without RFID circuit elements To, based on the detection results of the cartridge sensor 81. In a case where the cartridge is a tag cartridge, the judgment is satisfied and the flow proceeds to the next step, step S150.

In step S150, a judgment is made as to whether or not the transported label tape 109 with print has been transported a predetermined distance (for example, a transport distance long enough for a corresponding RFID circuit element To for label production, to which the printed cover film 103 has been bonded, to reach the loop antenna LC1 for label production). The transport distance judgment at this time, as in step S130, may also be made by counting the pulse count output to the feeding motor driving circuit 121 configured to drive the feeding motor 119, which is a pulse motor.

This step is repeated until the label tape 109 with print has been transported the predetermined distance and, once the label tape 109 with print has been transported the predetermined distance, the judgment is made that the condition is satisfied in step S150, and the flow proceeds to the next step S200.

Next, in step S200, tag access processing is performed. Specifically, once the label tape 109 with print has been transported to the communication position of the RFID circuit element To for label production (to the position where the RFID circuit element To for label production is in front of the loop antenna LC1 for label production), transportation and printing are stopped and information transmission/reception is performed. Subsequently, transport and printing is resumed, printing is completed, the label tape 109 with print is further transported, and transportation is stopped at the rear half-cut position so as to form the rear half-cut line CH2 (refer to FIG. 12 described later).

When step S200 is completed as described above, the flow proceeds to step S155 (at this time, the transport of the label tape 109 with print is resumed in step S200). In the step S147, in a case where the cartridge is a regular cartridge not having an RFID circuit element To, the judgment is made that the condition is not satisfied and the flow proceeds to step S300, where printing is completed at the print end position and ordinary label production processing for forming the rear half-cut line HC2 is performed (for details, refer to FIG. 11 described later), and the flow proceeds to the next step S155.

In step S155, the judgment is made as to whether or not the label tape 109 with print has been transported to the above-described full-cut position. This judgment may be made as described above by detecting, for example, the transported distance after the identifier PM of the base tape 101 has been detected in the step S120, using a predetermined known method (by counting, for example, the number of pulses output by the feeding motor driving circuit 121 configured to drive the feeding motor 119, which is a pulse motor). Until the full-cut position is reached, the judgment is made that the condition is not satisfied and this step is repeated. Once the position has been reached, the judgment is made that the condition is satisfied, and the flow proceeds to the next step S160.

In step S160, as in step S135, the rotation of the feeding roller 27, the ribbon take-up roller 106, and the driving roller 51 is stopped, thereby stopping the transport of the label tape 109 with print. With this arrangement, the feeding of the base tape 102 from the first roll 101, the feeding of the cover film 104 from the second roll 103, and the transport of label tape 109 with print are stopped with the movable blade 41 of the cutting mechanism 15 in front of the full-cut position.

Subsequently, in step S165, a control signal is output to the cutter motor driving circuit 122 so as to drive the cutter motor 43 and rotate the movable blade 41 of the cutting mechanism 15, thereby performing the full cutting process wherein the cover film 103, the adhesive layer 101a, the base film 101b, the adhesive layer 101c, and the separation sheet 101d of the label tape 109 with print are all cut to form the cutting line. Thus, a label-shaped RFID label T, which includes the RFID circuit element To for label production to which the RFID tag information has been written, and on which predetermined printing has been performed correspondingly thereto, (or an ordinary label L on which predetermined printing has been performed) is formed by cutting the label tape 109 with print using the cutting mechanism 15.

Subsequently, the flow proceeds to step S170 where a control signal is output to the tape discharging motor driving circuit 123 via the input/output interface 113 so as to drive the tape discharging motor 65 again, thereby rotating the driving roller 51. As a result, the driving roller 51 begins transport once again. Accordingly, the RFID label T or ordinary label L thus formed in the shape of a label in the step S165 is transported toward the label discharging exit and discharged to outside the apparatus from the label discharging exit 11, and the flow ends.

The present disclosure is not limited to the procedure indicated in the above flow. Steps may added or removed or the order of the steps may be changed without departing from the spirit and scope of the present disclosure.

A detailed procedure of the step S200 is shown in FIG. 9.

First, in step S210, the judgment is made as to whether or not the label tape 109 with print has been transported to the position of communication with the loop antenna LC1 for label production. The judgment at this time as well, as in step S130 of FIG. 8, may be made by detecting, for example, the transported distance after the identifier PM of the base tape 101 has been detected in the step S120, using a predetermined known method.

This step is repeated until the label tape 109 with print reaches the communication position and, once the label tape 109 with print has reached the communication position, the judgment is made that the condition has been satisfied in step S210, and the flow proceeds to the next step S220.

In step S220, as in step S135, the rotation of the feeding roller 27, the ribbon take-up roller 106, and the driving roller 51 is stopped, thereby stopping the transport of the label tape 109 with print with the loop antenna LC1 for label production substantially in front of the RFID circuit element To for label production. Also, the power supply to the print head 23 is stopped so as to stop (pause) the printing of the label print R.

Next, in step S400, information is transmitted and received via wireless communication between the loop antenna LC1 for label production and the RFID circuit element To for label production, and an information transmission process for writing the tag writing information to the IC circuit part 151 of the RFID circuit element To for label production (or reading information stored in advance in the IC circuit part 151) (see FIG. 10 discussed below for details).

Subsequently, the flow proceeds to step S240 and, as in step S145 of FIG. 8, the feeding roller 27, the ribbon take-up roller 106, the driving roller 51 are rotationally driven so as to resume the transport of the label tape 109 with print, and power is supplied to the print head 23 so as to resume the printing of the label print R.

Next, the flow proceeds to step S250, where a judgment is made as to whether the label tape 109 with print has been transported as far as the print end position (set in step S105). The judgment at this time as well, similar to the above, may be made by detecting, for example, the transported distance after the identifier PM has been detected in the step S120, using a predetermined publicly known method. Until the print end position is reached, the judgment is made that the condition is not satisfied and this step is repeated. Once the print end position has been reached, the judgment is made that the condition is satisfied, and the flow proceeds to the next step S260.

In step S260, similar to step S135 of FIG. 8, the power supply to the print head 23 is stopped, thereby stopping the printing of the label print R. As a result, the printing of the label print R in the print area S is completed.

In the next step S263, the judgment is made as to whether or not the label tape 109 with print has been transported to the previously described rear half-cut position (in other words, whether or not the label tape 109 with print has reached the position where the half-cutter 34 of the half-cutting module 35 is in front of the rear half-cut line HC2). The judgment at this time as well, similar to the above, may be made by detecting, for example, the transported distance after the identifier PM has been detected in the step S120, using a predetermined publicly known method. Until the rear half-cut position is reached, the judgment is made that the condition is not satisfied and this step is repeated. Once the position has been reached, the judgment is made that the condition is satisfied, and the flow proceeds to the next step S267.

In step S267, as in step S220, a control signal is output to the feeding motor driving circuit 121 and the tape discharging motor driving circuit 123 via the input/output interface 113 so as to stop the driving of the feeding motor 119 and the tape discharging motor 65, thereby stopping the rotation of the feeding roller 27, the ribbon take-up roller 106, and the driving roller 51. With this arrangement, the feeding of the base tape 102 from the first roll 101, the feeding of the cover film 104 from the second roll 103, and the transport of label tape 109 with print are stopped with the movable blade 34 of the half-cut unit 35 in front of the half-cut line HC2.

Next, the flow proceeds to step S270 where a control signal is output to the half-cutter motor driving circuit 128 so as to rotate the half-cutter 34, thereby cutting the cover film 103, the adhesive layer 101a, the base film 101b, and the adhesive layer 101c of the label tape 109 with print so as to perform the rear half-cutting which forms the rear half-cut line HC2.

Then, the flow proceeds to step S280 where, as in step S240, the feeding roller 27, the ribbon take-up roller 106, and the driving roller 51 are rotationally driven, thereby resuming the transport of the label tape 109 with print. With the above, the routine ends.

The present disclosure is not limited to the procedure indicated in the above flow. Steps may added or removed or the order of the steps may be changed without departing from the spirit and scope of the present disclosure.

A detailed procedure of the step S400 is shown in FIG. 10. In this example, of the above-described information writing and information reading, information writing will be described as an example.

In FIG. 10, first in step S402, a switching control signal is output to the switching circuit 86 so as to connect the antenna sharing device 240 and the loop antenna LC1 for label production.

Subsequently, the flow proceeds to step S405 where a control signal is output to the transmission circuit 306 via the input/output interface 113, and an interrogation wave subjected to predetermined modulation is transmitted as an inquiry signal (a "Read tag ID" command signal in this example) for acquiring the ID information stored in the RFID circuit element To for label production to the RFID circuit element To for label production subject to writing via the loop antenna LC1 for label production. As a result, the memory part 157 of the RFID circuit element To for label production is initialized.

Subsequently, in step S415, a reply signal (including tag ID) sent from the RFID circuit element To for label production subject to writing is received via the loop antenna LC1 for label production in response to the "Read tag ID" command signal, and incorporated via the reception circuit 307 and the input/output interface 113.

Next, in step S420, a judgment is made as to whether or not the tag ID of the RFID circuit element To for label production has been normally read, based on the received reply signal.

If the judgment is not satisfied, the process moves to step S425 where 1 is added to M and then in step S430 a judgment is made as to whether M=5 or not. In a case where M is less than or equal to four, the judgment is made that the condition has not been satisfied and the flow returns to step S405 and the same procedure is repeated. In a case where M equals five, the flow proceeds to step S435 where an error display signal is output to the PC 118 via the input/output interface 113 so as to display the corresponding writing failure (error). Subsequently, the routine ends. With such an arrangement, a maximum of five retries are performed even if initialization fails.

In a case where the judgment is made that the condition is satisfied in step S420, the flow proceeds to step S440 where a control signal is output to the transmission circuit 306, the tag ID read in step S415 is specified so as to transmit desired data as a signal to be written to the memory part 157 (a "Write" command signal in this example) to the RFID circuit element To for label production, to which information writing is to be performed via the loop antenna LC1 for label production, and the information is written.

Subsequently, in step S445, a control signal is output to the transmission circuit 306 and the tag ID read in step S415 is specified so as to transmit an interrogation wave to which predetermined modulation has been performed as a signal (a "Read" command signal in this example) for reading data recorded in the memory part 157 of the tag to the RFID circuit element To for label production, to which information writing is to be performed via the loop antenna LC1 for label production, thereby prompting a reply. Then, in step S450, a reply signal sent from the RFID circuit element To for label production, to which writing is to be performed in response to the "Read" command signal is received via the loop antenna LC1 for label production, and incorporated via the reception circuit 307.

Next, in step S455, the information stored within the memory part 157 of the RFID circuit element To for label production is checked based on the received reply signal, and the judgment is made as to whether or not the transmitted predetermined information has been normally stored in the memory part 157, using a known error detecting code (CRC code; Cyclic Redundancy Check, etc).

If the judgment is not satisfied, the process moves to step S460 where 1 is added to N, and then to step S465, where a judgment is made as to whether or not N=5. In a case where N is less than or equal to four, the judgment is not satisfied, and the process returns to step S440 and the same procedure is repeated. In a case where N equals five, the flow proceeds to step S435 where a corresponding writing failure (error) is similarly displayed on the PC 118, and the routine ends. With such an arrangement, a maximum of five retries are performed even if information writing fails.

In a case where the judgment is made that the condition is satisfied in step S455, the flow proceeds to step S470 where a control signal is output to the transmission circuit 306, the tag ID read in step S415 is specified so as to transmit an interrogation wave to which predetermined modulation has been performed as a signal (a "Lock" command signal in this example) for prohibiting the replacement of data recorded in the memory part 157 of the tag to the RFID circuit element To for label production, to which information writing is to be performed via the loop antenna LC1 for label production, and the writing of new information to the RFID circuit element To for label production is prohibited. As a result, the writing of RFID tag information to the RFID circuit element To for label production, to which writing is to be performed, is completed.

Subsequently, the flow proceeds to step S480 where the combination of information written to the RFID circuit element To for label production in the step S440 and the corresponding print information of the label print R to be printed in the print area S by the print head 23 is output via the input/output interface 113 and the communication line NW and stored in the PC 118 (or in an information server or route server not shown). This stored data is preferably stored and maintained on the display part 118a of the PC 118 as necessary. With the above, the routine ends.

The present disclosure is not limited to the procedure indicated in the above flow. Steps may added or removed or the order of the steps may be changed without departing from the spirit and scope of the present disclosure.

A detailed procedure of the step S300 is shown in FIG. 11.

In FIG. 11, first in step S310, a judgment is made as to whether or not the cover film 103 has been bonded to the base tape 101 not having an RFID circuit element To and the generated label tape 109 with print has been transported to the print end position (set in step S105 described above). The judgment at this time as well, similar to the above, may be made by detecting, for example, the transported distance after the identifier PM has been detected in the step S120, using a predetermined publicly known method. Until the print end position is reached, the judgment is made that the condition is not satisfied and this step is repeated. Once the position has been reached, the judgment is made that the condition is satisfied, and the flow proceeds to the next step S320.

In step S320, the power supply to the print head 23 is stopped so as to stop the printing of the label print R. As a result, the printing of the label print R in the print area S is completed.

Subsequently, the flow proceeds to step S330 where, as in step S270, the rear half-cut processing for forming the rear half-cut line HC2 by the half-cutter 34 after transport to the predetermined rear half-cut position is performed. With the above, the routine ends.

The present disclosure is not limited to the procedure indicated in the above flow. Steps may added or removed or the order of the steps may be changed without departing from the spirit and scope of the present disclosure.

As shown In FIG. 12A, FIG. 12B and FIG. 13, the RFID label T has a five-layer structure in which the cover film 103 is added to the four-layer structure shown in FIG. 5 described above. The five layers are constituted by the cover film 103, the adhesive layer 101a, the base film 101b, the adhesive layer 101c, and the separation sheet 101d, which are laminated from the cover film 103 (upper side in FIG. 13) towards the opposite side (lower side in FIG. 7). Then, the RFID circuit element To for label production that includes the loop antenna 152 provided on the back side of the base film 101b as previously described is provided within the base film 101b and the adhesive layer 101c, and the label print R (the letters "ABCD" in this example) corresponding to the stored information, etc., of the RFID circuit element To for label production is printed within the print area S on the back side of the cover film 103.

On the cover film 103, the adhesive layer 101a, the base film 101b, and the adhesive layer 101c are formed the half-cut lines HC (half-cut areas; two lines in this example: the front half-cut line HC1 and the rear half-cut line HC2) substantially along the tape width direction by the half-cutter 34 as previously described. In the cover film 103, the label print R is printed in an area sandwiched between the half-cut lines HC1 and HC2, and both sides in the tape lengthwise direction between these half-cut lines HC1 and HC2 from this area are the front end area S1 and rear end area S2, respectively.

Thus, a major feature of the present embodiment is acquisition of information stored in IC circuit parts via wireless communication from RFID labels T (command tags Tm, provided with the RFID circuit elements To for information acquisition described above) produced by the label producing apparatus 1, using an information acquisition function (reader function) from outside the apparatus using the loop antenna LC2 for information acquisition provided to the label producing apparatus 1. At this time, the command signal for each operation device within the label producing apparatus 1, such as the print head 23, the feeding roller 27, the loop antenna LC for label production, the cutting mechanism 15, and the half-cutting module 35, may be stored in that command tag Tm. Then, the command tag Tm is read so as to acquire the command signal, thereby causing operation of the corresponding operation device based on that command signal. In the following, details on the functions will be described in order.

In the present embodiment, a case is described as an example in which a command execution function that is based on the reading of the command tag Tm is applied to the inspection (maintenance inspection after product purchase, inspection prior to product shipment, etc.) of the label producing apparatus 1. Further, the content of the command signal stored in the command tag Tm at the time the various operation devices are to be given operation instructions is substantially (at least partially) standardized to the command signal input via the input/output interface 113 from the PC 118 and the command signal from the operation device (the power key 14, the cutter driving key 90, etc., in this example) of the label producing apparatus 1. That is, in the label producing apparatus 1 of the present embodiment, the above inspection processing may be executed from the command tag Tm, from the PC 1, and from the operation device of the label producing apparatus 1.

The control procedure of the inspection processing shown in FIG. 14 is executed by the control circuit 110 of the label producing apparatus 1.

In FIG. 14, first in step S3010, the count value of the keypress counter and other various data described later are initialized.

Next, in step S3012, a judgment is made as to whether the cartridge 7 mounted on the cartridge holder 6 is a tag cartridge having RFID circuit elements To or is an ordinary cartridge without RFID circuit elements To, based on the detection results (cartridge information) of the cartridge sensor 81, as in step S147. If the cartridge is not a tag cartridge, the judgment is not satisfied, the flag FM for mode switching is set to 0 in step S3014, and the process moves to step S3020. If the cartridge is a tag cartridge, the judgment in step S3012 is satisfied, the flag FM is set to 1 in the next step, step S3016, and the process moves to step S3020.

In step S3020, an operation signal is input from operation device (in this example the power key 14 and the cutter driving key 90 described above) of the label producing apparatus 1, and a key scan process is performed to detect whether or not either is operated.

Then, in step S3030, information acquisition processing (tag read processing) from the RFID circuit element To for information acquisition of the command tag Tm (where the inspection command signal is stored in advance; details described later) of an external device is performed using the loop antenna LC2 for information acquisition.

Specifically, first a switching control signal is output to the switching circuit 86 via the input/output interface 113 so as to connect the antenna sharing device 240 and the loop antenna LC2 for information acquisition. Then, a control signal is output to the transmission circuit 306 via the input/output interface 113, and an interrogation wave subjected to predetermined modulation is sent as an inquiry signal for acquiring the command signal stored in the RFID circuit element To for information acquisition provided in the command tag Tm to the RFID circuit element To for information acquisition to be read via the loop antenna LC2 for information acquisition. Subsequently, a reply signal (including the inspection command signal from the tag) sent from the RFID circuit element To for information acquisition in response to the inquiry signal is received via the loop antenna LC2 for information acquisition, and incorporated and acquired via the reception circuit 307 and the input/output interface 113.

Subsequently, in step S3040, an operation signal (the command signal from an operation terminal) from the PC 118 is input (received) via the input/output interface 113.

Then, in step S3100, command determination processing based on key pressing corresponding to the scan result of the key scan processing of the step S3020 is executed (for details, refer to FIG. 15 described later).

Next, in step S3200, command determination processing based on I/F reception data corresponding to the interface data reception processing result of the step S3040 is executed (for details, refer to FIG. 16 described later).

Subsequently, in step S3300, command determination processing based on the RFID tag corresponding to the tag read processing result of the step S3030 is executed (for details, refer to FIG. 17 described later).

Then, in step S3400, based on the processing result of the step S3100, step S3200, and step S3300, the processing corresponding to the content of the command signal determined by one of these steps is executed (for details, refer to FIG. 18).

Subsequently, in step S3050, the judgment is made as to whether or not the apparatus power source of the label producing apparatus 1 is OFF and, if so, the condition is satisfied, and the flow ends. If the apparatus power source remains ON, the condition is not satisfied, the flow returns to step S3012, and the same procedure is repeated.

A detailed procedure of the step S3100 is shown in FIG. 14.

In FIG. 15, first in step S3110, the judgment is made as to whether or not the request command has already been determined in other processing (in the command determination processing based on interface reception data in step S3200, or the command determination processing based on the RFID tag in step S3300). If the request command has been determined in other processing, the judgment is made that the condition is satisfied, and the flow ends. If the request command has not been determined in other processing, the judgment is made that the condition is not satisfied, and the flow proceeds to the next step S3120.

In step S3120, the judgment is made as to whether or not the power key 14 of the label producing apparatus 1 is being pressed, based on the result of the scan processing of the step S3020. If the power key 14 is being pressed, the judgment is made that the condition is satisfied, and the flow proceeds to step S3130.

In step S3130, the judgment is made as to whether or not the cutter driving key 90 of the label producing apparatus 1 has been newly pressed. If the cutter driving key 90 has not been newly pressed, the judgment is made that the condition is not satisfied, the flow returns to step S3120, and the same procedure is repeated. If the cutter driving key 90 has been newly pressed, the judgment is made that the condition is satisfied, the flow proceeds to step S3140 where the count value of the keypress counter (provided in the control circuit 110, for example) is incremented by one, the flow returns to step S3120, and the same procedure is repeated.

On the other hand, in step S3120, in a case where the power key 14 of the label producing apparatus 1 has not been pressed, the judgment is made that the condition is not satisfied, and the flow proceeds to step S3150. In step S3150, the judgment is made as to whether or not the count value of the keypress counter is zero. In a case where the count value is zero, the judgment is made that the condition is satisfied, and the routine ends. In a case where the count value is not zero, the judgment is made that the condition is not satisfied, and the flow proceeds to step S3160.

In step S3160, the command table is searched based on the keypress counter value (corresponding to the command signal) judged in step S3150, and the corresponding request command is determined in step S3170. When this happens, the count value and the request command type are stored within the control circuit 110, for example, in advance in a predetermined form of correlation (such as a table, for example; refer to FIG. 19 described later). In step S3170, the command of the content corresponding to the keypress count value determined in the step S3150 is determined based on the search result of the step S3160. Once the request command is determined, the routine ends.

A detailed procedure of the step S3200 is shown in FIG. 16.

In FIG. 16, first in step S3210, the judgment is made as to whether or not the request command has already been determined in other processing (in the command determination processing based on the keypress command determination process of step S3100, or the command determination processing based on the RFID tag in step S3300). If the request command has been determined in other processing, the judgment is made that the condition is satisfied, and the flow ends. If the request command has not been determined in other processing, the judgment is made that the condition is not satisfied, and the flow proceeds to the next step S3220.

In step S3220, the judgment is made as to whether or not an operation signal for executing inspection processing has been input (received) from the PC 118 in the input/output interface 113, based on the data reception result of the step S3040. If an operation for executing inspection processing has not been performed, the judgment is made that the condition is not satisfied, and the routine ends. If an operation for executing inspection processing has been performed, the judgment is made that the condition is satisfied, and the flow proceeds to step S3230.

In step S3230, a command table search is conducted based on the command signal input in the step S3220 and, in step S3240, the corresponding request command is determined. That is, as described above, the command signal and request command type from the PC 118 are stored in the control circuit 110, for example, in advance in a predetermined form of correlation (such as a table similar to that described above, for example; refer to FIG. 19 described later). In step S3240, the command of the content corresponding to the command signal identified in the step S3220 is determined based on the search result of the step S3230. Once the request command is determined, the routine ends.

A detailed procedure of the step S3300 is shown in FIG. 17.

In FIG. 17, first in step S3310, the judgment is made as to whether or not the request command has already been determined in other processing (in the command determination processing based on the keypress command determination process of step S3100, or the command determination processing based on the interface reception data in step S3200). If the request command has been determined in other processing, the judgment is made that the condition is satisfied, and the flow ends. If the request command has not been determined in other processing, the judgment is made that the condition is not satisfied, and the flow proceeds to the next step S3320.

In step S3320, the judgment is made as to whether or not information (read data) has been read from the command tag Tm to be read, based on the reading result of the command tag Tm in the step S3030. If the information has not been read, the judgment is made that the condition is not satisfied, and the routine ends. If the information has been read, the judgment is made that the condition is satisfied, and the flow proceeds to step S3330.

In step S3330, the inspection command signal (for executing inspection processing) is extracted and acquired from the information read in step S3320.

Subsequently, the flow proceeds to step S3340 where a command table search is conducted based on the inspection command signal acquired in step S3330 and, in step S3350, the corresponding request command is determined. That is, as described above, the command signal and request command type from the command tag Tm are stored in the control circuit 110, for example, in advance in a predetermined form of correlation (such as a table similar to that described above, for example; refer to FIG. 19 described later). In step S3350, the command with the content corresponding to the command signal acquired in step S3330 is determined based on the search result of the step S3340. Once the request command is determined, the routine ends.

A detailed procedure of the step S3400 is shown in FIG. 18.

In FIG. 18, first in step S3410, the judgment is made as to whether or not the request command has been determined in the command determination processing based on key pressing in the step S3100, the command determination processing based on interface reception data in step S3200, or the command determination processing based on the RFID tag in step S3300. If the request command has not been determined, the judgment is made that the condition is not satisfied, and the flow ends. In a case where the request command has been determined in one of the processes, the judgment is made that the condition is satisfied, and the flow proceeds to step S3415.

In step S3415, a judgment is made as to whether or not the flag FM for mode switching is 0. If FM is 0 (in other words, if the cartridge is not a tag cartridge, but rather an ordinary cartridge), the judgment is satisfied, the process moves to step S3420, command operation mode for executing corresponding operation based on operation signals is entered. At the same time, if FM is 1 (in other words, if the cartridge is a tag cartridge), the judgment is not satisfied, the process moves to step S3430, and command label production mode for producing the command tags Tm is entered. In this example, the mode switches according to the type of cartridge, but this is not a limitation, and it is possible to select the mode by an appropriate operation input by the operator.

In step S3420, a control signal (or driving signal) corresponding to the request command is output to the target operation device (or driving device) of the determined request command, and the routine ends.

In step S3430, the inspection command signal corresponding to the request command thus determined is used to produce the RFID labels T in which the command signal has been written to the IC circuit part 151.

Since the content of the control executed by the control circuit 110 in the label producing process is sufficiently laid out in FIG. 8, FIG. 9, and FIG. 10, a detailed description thereof is omitted. In particular, in step S440 of FIG. 10, a control signal is output to the transmission circuit 306 and sent to the RFID circuit element To be written via the loop antenna LC1 for label production, thereby writing the command signal. Moreover, it is also possible to write not the command signal itself, but rather information (a tag ID is possible) associated with the command signal stored in a predetermined place in a separately provided data server. The process of storing the combination of the print information and the writing information of step S480 to the server can be omitted.

Step S3430 is thus completed, and the routine finishes.

As shown in FIG. 19, a "Cut" function configured to cut the label tape 109 with print (or automatically feed a predetermined distance and then cut the label tape 109 with print), a "Print HELP" function configured to print the function description information of the label producing apparatus 1, and a "Print medium information" function configured to print the tape attribute information of the base tape 101 and the cover film 103, etc., are provided as the content of the command processing requested for inspection processing execution in this example. To each of the functions in the figure is assigned in corresponding columns a command signal "(interface reception command") input from the PC 118 via the interface 113, a command signal ("command with RFID tag") read from the command tag Tm, and a count value of the keypress counter ("keypress count value") (i.e., the functions are standardized as substantially equivalent command signals providing instructions for identical operations).

For example, the "Cut" function is assigned the command signal "0x1B TEST03" input from the PC 118 via the interface 113, the command signal "0x1B TEST03" read from the command tag Tm, and the count value "3" of the keypress counter. Accordingly, if the command signal "0x1B TEST03" is input from the PC 118 via the interface 113, if the command signal "0x1B TEST03" is read from the RFID circuit element To in the command tag Tm, or if the count value of the keypress counter is "3," the ultimate request command is set (in common) to "Cut" (see step S3170, step S3240, and step S3350).

Similarly, if the command signal "0x1B HELP01" is input from the PC 118 via the interface 113, if the command signal "0x1B HELP01" is read from the RFID circuit element To in the command tag Tm, or if the count value of the keypress counter is "9," the ultimate request command is set (in common) to "Print HELP" (see step S3170, step S3240, and step S3350).

Similarly, if the command signal "0x1B HELP02" is input from the PC 118 via the interface 113, if the command signal "0x1B HELP02" is read from the RFID circuit element To in the command tag Tm, or if the count value of the keypress counter is "10," the ultimate request command is set (in common) to "Print Media Information" (see step S3170, step S3240, and step S3350).

As shown in FIG. 20A and FIG. 20B, the command tag Tm is provided with the RFID circuit element To for information acquisition described above. Parts equivalent to FIG. 12 are given the same reference numerals, and the description is omitted or simplified. This RFID circuit element To, as described above, comprises the IC circuit part 151 and the antenna 152. As described above, the command tag Tm was produced as the RFID label T to whose IC circuit part 151a command signal was written by the label producing apparatus 1. (See step S3430 in FIG. 18.) Note that this is not a limitation, and it is also possible to provide, for example, the RFID circuit element To a card-type substrate via an appropriate protective member.

As shown in FIG. 21, the IC circuit part 151 of the RFID circuit element To of the command tag Tm comprises, as above, the rectification part 152, the power source part 154, the control part 155, the clock extraction part 156, the modem part 158, and the memory part 157. Note that the parts identical to those in FIG. 7 are denoted using the same reference numerals, and descriptions thereof will be suitably omitted. Command signals for inspection described above are written to the memory part 157 where they are stored and held.

As shown in FIG. 22, guidance information (function description information) for the operator that pertains to key operations is printed in this example. This function description information is set and stored in advance in the control circuit 110, and this stored print data is printed. With the patterned print data stored in advance, "Print HELP" is simply executed.

In the example shown in FIG. 23A, tape attribute information such as the tape type [the bonding type (laminated type) for ordinary labels not comprising an RFID circuit element To], tape width (36 mm), corresponding printing speed (20 mm), and print area length (30 mm) is printed. (In this example, an ordinary L on which that information is printed is formed on the tape). In the example shown in FIG. 23B as well, tape attribute information such as the tape type (RFID label tape comprising an RFID circuit element To), tape width (24 mm), corresponding printing speed (20 mm), and print area length (20 mm) is similarly printed. (In this example, an RFID label T on which that information is printed is formed on the tape). Note that the disposed pitch of the base tape 101 of the RFID circuit element To may also be printed.

Furthermore, during execution of the above "Print medium information," the present disclosure is not limited to print corresponding to tape attribute information as described above, but may print the print corresponding to the cartridge type detected by the cartridge sensor 81.

In the present embodiment configured as described above, the various operations for inspection processing (the print HELP, print medium information, cut processing, etc., in the above example) are performed on the corresponding devices (the print head 23, the cutting mechanism 15, etc., in the above example) at the time of inspection of the label producing apparatus 1 (including various inspections and testing such as maintenance and pre-shipment inspections). When this happens, the command for performing such an operation is either input via the input/output interface from the PC 118 through wired communication, via input based on operation of the keys 14 and 90, etc., of the label producing apparatus 1, or via wireless communication using the command tag Tm.

That is, the command signal for instructing the operation device to perform an operation may be input not only in wired form from the PC 118 (or based on operation of the keys 14 and 90, etc., of the label producing apparatus 1) but also in wireless form based on the command tag Tm. In the case of wireless input, a simpler operation of reading the RFID tag Tm is sufficient compared to a case where a command signal is generated from a complex operation using the PC 118 (or the keys 14 and 90, etc.). That is, the present disclosure does not require the operator to perform a complex operation using the keys, buttons, and switches of the PC 118 in order to generate a command signal, thereby reducing the operation labor of the operator.

The present embodiment is itself able to make the command tag Tm used for reducing the operation labor burden described above. In other words, since there is no need to prepare another separate device for producing command tags Tm, it is possible to improve the convenience of the operator even further.

With the present embodiment in particular, the command tags Tm are produced in an aspect which makes it possible for them to be attached as the RFID labels T. As a result, the command tags Tm can be attached to the housing 200 of the label producing apparatus 1 (including temporary attachment on the assumption of later removal), either before or after reading information via the loop antenna LC2 for information acquisition. When attached in this manner, the command tags Tm need not be displayed near the housing 200 by the operator, as the reading of information from the command tags Tm is done automatically, and can cause corresponding operating devices to execute a variety of operations. This effect is particularly advantageous for functions which are preferably performed every time the apparatus is launched, such as initialization during use, cleaning, and so on. (See step S3010 in FIG. 14, for example.) This kind of attachment can make clearer the one-on-one correspondence between the label producing apparatus 1 and the command tag Tm during manufacturing (for purposes of shipping and selling as a set).

Further, particularly with the present embodiment, a print area S is provided and predetermined printing is done, when producing the command tag Tm as a label. The result is that it is possible to print the type of command signal or the content of the function of the command signal, and not just display the function as a simple "command tag" as in FIG. 20. IN this case, using each command tag Tm gives the operator the possibility of clear visual confirmation of which operating device can be caused to execute what operation.

Further, particularly with the present embodiment, as described using FIG. 18, it is possible to associate a single request command with two operations on the apparatus side, and select one of the two operations to be executed via mode switching. Specifically, with a single request command (e.g., when a single operation is performed via operation device either inside or outside the apparatus 1), a command tag Tm can be produced by writing a command signal corresponding to the request command (or information corresponding thereto) if the apparatus is in command label production mode (step S3430 in FIG. 18). On the other hand, if the apparatus 1 is in command operation mode an operation (e.g., feeding, printing, communicating, etc.) can be performed corresponding to at least one operating device (e.g., the tape feed roller driving shaft 108, the print head 23, the antennas LC1 and LC2, etc.) corresponding to the request command (step S3420 in FIG. 18). Furthermore, by linking the detection from the cartridge sensor 81 and the mode switching, it is possible for the apparatus 1 to automatically switch between producing the command tags Tm or operation control for the operating devices, according to the type of the cartridge 7 mounted on the cartridge holder 6, in response to the same operation by the operation device.

When this happens, the request command can be read and acquired from the RFID circuit element To for information acquisition of the command tag Tm as described above. Accordingly, if the apparatus 1 is in command operation mode, as described above, it is possible to perform operation corresponding to at least one operating device corresponding to the request command, and if the apparatus 1 is in command label production mode, the command tags Tm can be produced by writing the command signal corresponding to the request command to the RFID circuit elements To. In other words, in this case, it is possible to produce command tags Tm for the same function by reading the command tag Tm, and thus make copies of the command tag Tm.

Note that various modifications may be made according to the present embodiment without departing from the spirit and scope of the disclosure, in addition to the above-described embodiment. Description will be made below regarding such modifications.

(1) Examples of Other Common Commands

While the above described an illustrative scenario in which "Cut," "Print HELP," and "Print medium information" were used as examples of request commands standardized for inspection processing execution using the correlation table of FIG. 19, the present disclosure is not limited thereto. As shown in FIG. 24, commands related to the loop antenna LC1 for label production, such as "Write RFID" and "Read RFID," and commands related to the print head 23 such as "Receive print data," "Start printing," and "Set print parameters," may be replaced and standardized as described above. As shown in the figure, the disabling and enabling of reading information from the RFID tag Tm via the loop antenna LC2 for information acquisition ("Enable" "Disable") may be prepared as commands as well. These various commands may be suitably used during the above-described inspection of the label producing apparatus 1 (maintenance inspection after product purchase, inspection prior to product shipment, etc.) as well as applied to the various operation control processes performed during label production that were described using FIG. 8, etc., in each of the above embodiments.

(2) The Tag Label Producing Apparatus Contains all Functions Alone

In the above embodiments, the PC 118 was constituted as a separate body from the label producing apparatus 1 as an operation terminal (operation device outside the tag label producing apparatus), but this is not a limitation, and it is possible to endow the label producing apparatus 1 with the functionality of the PC 118 (making it a so-called "stand-alone" type). In this case, the label producing apparatus 1 comprises a display part (not shown) of a liquid crystal screen, etc., configured to execute the various displays, and an operation part (not shown) of keys and buttons, etc., for operator entry by the operator, wherein the control circuit 110 executes the control content to be performed by the control circuit 130 of the PC 118.

According to the present modification, operation device separate from the label producing apparatus 1 such as the PC 118 of the above embodiment is not required, thereby making it easy for the operator to hand-carry the entire label manufacturing system LS and thus further improving operator convenience.

(3) Not Performing Bonding

While the above embodiment 1 has been described in connection with an illustrative scenario in which printing is performed on the cover film 103 that is separate from the base tape 101 containing the RFID circuit element To, and the two are bonded to each other so as to form a so-called laminated type label, the present disclosure is not limited thereto. That is, the present embodiment may also be applied to a case where a so-called non-laminated type label where printing is directly performed on a cover film that is provided on the tag tape (or ordinary tape) is formed.

As shown in FIG. 25, the cartridge 7' has a first roll 102' around which is wound a thermal tape 101' and a feeding roller' for feeding the thermal tape 101' in a direction out of the cartridge 7'. Note that the parts identical to those in FIG. 5 are denoted using the same reference numerals, and descriptions thereof will be suitably omitted.

The first roll 102' stores, in a manner such that it is wound around a reel member 102a', the strip transparent thermal tape 101', which has a structure in which a plurality of the RFID circuit elements To are serially formed along the longitudinal direction. The reel member 102a' is rotationally inserted and housed in a boss 95 established on the bottom of the cartridge 7'.

The thermal tape 102' wound around the first roll 102' has a three-layer structure in this example (refer to the partially enlarged view of FIG. 25), comprising a cover film 101a' formed of PET (polyethylene terephthalate) or the like having a thermal recording layer on the surface, an adhesive layer 101b' formed of a suitable adhesive material, and a separation sheet 101c'. The three layers of the thermal tape 101' are layered in that order from the side rolled to the inside to the side corresponding to the opposite side.

The loop antenna 152 configured to transmit/receive information and constructed in a loop coil shape is provided on the back side of the cover film 101a' in an integrated manner in this example, and the IC circuit part 151 is formed so that it is connected to the loop antenna 152, thereby forming an RFID circuit element To. The separation sheet 101c' is affixed to the cover film 101a' by the adhesive layer 101b' on the back side of the cover film 101a'. A predetermined identifier (a black identifier in this example; may be a hole that passes through the thermal tape 101' formed by laser processing, etc., similar to the above) PM for feeding control is established in a predetermined position (a position farther forward than the front head of the antenna 152 on the forward side of the feeding direction in this example) corresponding to each RFID circuit element To on the front side of the separation sheet 101c', as with the separation sheet 101d.

When the cartridge 7' is loaded to the cartridge holder 6 and the roller holder 25 is moved to the contact position from a distant location, the thermal tape 101' is brought between the print head 23 and the platen roller 26, and then between the feeding roller 27' and a sub-roller 28'. Then, the feeding roller 27', the sub-roller 28', and the platen roller 26 are synchronously rotated so as to feed out the thermal tape 102' from the first roll 102'.

The fed thermal tape 101' is supplied to the print head 23 on the downstream side of the feeding direction from an opening part 94 while guided to a substantially cylindrical shaped reel part 92 rotatably inserted in a reel boss 91 established on the cartridge bottom. Power is supplied to the plurality of heating elements from the print-head driving circuit 120 (refer to FIG. 6), causing the print head 23 to print the label print R on the front side of the cover film 101a' of the thermal tap 101' so as to form a label tape 109' with print, which is subsequently discharged to outside the cartridge 7' from a discharging exit 96.

After the label tape 109' with print has been discharged to outside the cartridge 7', the IC circuit part 151 is accessed (subjected to information reading/writing) via the loop antenna LC1. The subsequent transport by the driving roller 51 and cutting by the cutting mechanism 15 may be sufficiently performed using the same methods as those of the above embodiment, and descriptions thereof will be omitted.

The half-cutting module 35 differs from that corresponding to the so-called laminated type described in FIG. 3, etc. That is, the configuration described in FIG. 3, etc., has the receptacle 36 on the side of the print head 23, and the half-cutter 34 on the side of the platen roller 26. This is a configuration for performing half-cutting from the side opposite the side corresponding to the separation sheet of the tape to be produced. Nevertheless, in a case where thermal tape is used as in the present modification (and, similarly, in a case where ink ribbon is used with a type in which laminating is not performed, which is described later using FIG. 26), the separation sheet is on the side opposite that of the laminated type. Thus, since sections other than the separation sheet are subjected to half-cutting, the layout of the receptacle 36 and the half-cutter 34 is opposite the above. That is, the half-cutter 34 is located on the side of the print head 23, and the receptacle 36 is located on the side of the platen roller 26.

In this example, to make the cartridge information related to the cartridge 7' automatically detectable on the apparatus side, the cartridge RFID circuit element Tc in which information related to the cartridge 7' is stored is established on the wall surface 93 on the outer periphery of the cartridge 7. Further, an antenna AT configured to transmit/receive signals via non-contact wireless communication with the RFID circuit element Tc is provided on a side-wall part 6A opposite the RFID circuit element Tc of the cartridge holder 6.

In the present modification, the same effect as that of the above embodiment is achieved, as well as the effects described below. That is, the base tape having an RFID circuit element To sometimes exhibits a difference in tape thickness between the disposed area of the RFID circuit element To and the other areas, forming bumps and indentations on the tape front surface. At this time, while the bumps and indentations do not have much effect in the above embodiment 1 since the embodiment comprises a design wherein printing is performed on a cover film separate from the base tape comprising the RFID circuit element To and the two are bonded to each other, in a case where printing is performed directly on a thermal tape having an RFID circuit element To as in the present embodiment, the unique problem of the thermal tape being readily susceptible to printing defects such as thin spots arises due to the bumps and indentations on the tape front surface caused by the thickness of the RFID circuit element To. Here, printing may be performed so as to avoid the disposed area of the RFID circuit element To by using the aforementioned tag avoidance print mode, thereby avoiding the above-described print defects such as thin spots and resolving the above problem that may occur when the cover film and base tape are not bonded to each other. As a result, an aesthetically pleasing RFID label T (including a command tag Tm) without thin print spots, etc., is formed.

While in the configuration of the above modification printing is performed by using thermal tape as the tag tape, particularly by simply the heat generated by the print head 23 and not ink ribbon, etc., the present disclosure is not limited thereto, and printing may be performed using ordinary ink ribbon as in the case of the above embodiment.

As shown in FIG. 26, the cartridge 7" of the modification has a first roll 102" around which is wound a base tape 101". Note that the parts identical to those in FIG. 25 and FIG. 5 are denoted using the same reference numerals, and descriptions thereof will be suitably omitted.

The first roll 102" stores, in a manner such that it is wound around a reel member 102*a*", the strip transparent base tape 101", which has a structure in which a plurality of the RFID circuit elements To are serially formed along the longitudinal direction.

The base tape 102" wound around the first roll 102" has a three-layer structure in this example (refer to the partially enlarged view of FIG. 26), comprising a colored base film 101*a*" formed of PET (polyethylene terephthalate) or the like, an adhesive layer 101*b*" formed of a suitable adhesive material, and a separation sheet 101*c*". The three layers of the base tape 101" are layered in that order from the side rolled to the inside to the side corresponding to the opposite side.

The loop antenna 152 configured to transmit/receive information and constructed in a loop coil shape is provided on the back side of a base film 101*a*" in an integrated manner in this example, and the IC circuit part 151 is formed so that it is connected to the loop antenna 152, thereby forming an RFID circuit element To. The separation sheet 101*c*" is affixed to the base film 101*a*" by the adhesive layer 101*b*" on the back side of the base film 101*a*". A predetermined identifier (a black identifier in this example; may be a hole that passes through the base tape 101" formed by laser processing, etc., similar to the above) PM for feeding control is established in a predetermined position (a position farther forward than the front head of the antenna 152 on the forward side of the feeding direction in this example) corresponding to each RFID circuit element To on the front side of the separation sheet 101*c*", as described above.

When the cartridge 7" is loaded to the cartridge holder 6 and the roller holder 25 is moved to the contact position from a distant location, the base tape 101" and the ink ribbon 105 are brought between the print head 23 and the platen roller 26, and then between the feeding roller 27' and the sub-roller 28'. Then, the feeding roller 27', the sub-roller 28', and the platen roller 26 are synchronously rotated so as to feed out the base tape 102" from the first roll 102".

Meanwhile, at this time, the print-head driving circuit 120 (refer to FIG. 6) supplies power to the plurality of heating elements of the print head 23 so as to print the label print R corresponding to the stored information of the RFID circuit element To on the front surface of the base film 101*a*" of the base tape 101", thereby forming a label tape 109" with print, which is then discharged to outside the cartridge 7".

After the label tape 109" with print has been discharged to outside the cartridge 7", the IC circuit part 151 is accessed (subjected to information reading/writing) via the loop antenna LC1. The subsequent transport by the driving roller 51 and cutting by the cutting mechanism 15 may be sufficiently performed using the same methods as those of the above embodiment, and descriptions thereof will be omitted.

Further, the half-cutting module 35 is the same as that of the modification of the above-described FIG. 25.

In the present modification as well, the same effect as that of the above FIG. 25 is achieved.

(4) Other

While in the above the loop antenna LC2 for information acquisition is provided on the side surface of the apparatus main body 2, and information is read from the RFID circuit element To for information acquisition positioned on the outside of the apparatus main body 2 (the housing 200) on the side surface of the apparatus main body 2, the present disclosure is not limited thereto. That is, the loop antenna LC2 for information acquisition may be provided on the front surface or top surface of the apparatus main body 2, and information may be read from the RFID circuit element To for information acquisition positioned on the outside of the apparatus main body 2 (the housing 200) on the front surface or top surface of the apparatus main body 2. Furthermore, rather than providing the loop antenna LC1 for label production and the loop antenna LC2 for information acquisition separately, the design may be constructed so that the two are provided as a common loop antenna.

Further, while the above has been described in connection with an illustrative scenario in which the label tape 109 with print that had accessed (performed reading/writing with) the RFID circuit element To for label production is cut by the cutting mechanism 15 so as to form the RFID label T, the present disclosure is not limited thereto. That is, in a case where a label mount (a so-called die cut label) separated in advance to a predetermined size corresponding to the label is continuously disposed on the tape fed out from the roll, the present disclosure may also be applied to a case where the label is not cut using the cutting mechanism 15 but rather the label mount (a label mount containing the accessed RFID circuit element To for label production on which corresponding printing has been performed) only is peeled from the tape after the tape has been discharged from the label discharging exit 11 so as to form the RFID label T (including the command tag Tm).

Further, in the above, an example was given of printing, and writing and reading RFID tag information to the tape 101, 101', and 101" while moving, but this is not a limitation. It is also possible to print or read and write by first stopping the base tape 101, etc., at a predetermined position (and it is also possible to hold the base tape 101, etc., at a predetermined feeding guide for reading and writing).

Furthermore, the present disclosure is also not limited to a case where the RFID tag information is read from or written to the IC circuit part 151 of the RFID circuit element To, and print for identifying the RFID circuit element To is printed by the print head 10. This printing does not necessarily need to be performed, and the present disclosure may be applied to a case where RFID tag information is only read or written.

Furthermore, while in the above a case where the tag tape is wound around a reel member so as to form a roll, and the roll is disposed within the cartridge, and hence the tag tape is fed out from the cartridge has been described as an example, the present disclosure is not limited thereto. For example, an arrangement can be made as follows. Namely, a long-length or rectangular tape or sheet (including tape cut to a suitable length after being supplied from a roll) in which at least one RFID circuit element To is disposed is stacked (e.g., flat-stacked in a tray-like object) in a predetermined storage part so as to form a cartridge. The cartridge is then mounted to the cartridge holder of the label producing apparatus 1. Then, the tape or sheet is supplied or fed from the storage part, and printing or writing is performed, thereby creating RFID labels.

Also possible is a constitution in which the roll is removably mounted directly onto the tag label producing apparatus 1, or a constitution in which long tape-like or short rectangular tape or sheets are fed by a predetermined feeder mechanism one sheet at a time from outside the tag label producing apparatus 1 and supplied into the tag label producing apparatus 1, or without being limited to something attachable to the tag label producing apparatus 1 like a cartridge, also possible is a constitution in which a roll is provided to the apparatus body unremovably embedded or integral to the apparatus body. In each of these cases as well, the same effect is achieved.

Additionally, other than those previously described, approaches according to the respective embodiments and exemplary modifications may be utilized in combination as appropriate.

Note that various modifications which are not described in particular can be made according to the present disclosure without departing from the spirit and scope of the disclosure.

What is claimed is:

1. An RFID tag producing apparatus comprising:
    a housing (200);
    a feeding device (108) disposed inside said housing (200) that feeds a tag medium (101; 101'; 101"), an RFID circuit element (To) that comprises an IC circuit part (151) that stores information and a tag antenna (152) that transmits/receives information being arranged in said tag medium;
    a first antenna device (LC1) disposed inside said housing (200) that transmits and receives information via wireless communication to and from said RFID circuit element (To) of said tag medium (101; 101'; 101") fed by said feeding device (108);
    a writing control portion (S440) that writes a command signal for commanding operation of at least one operating device (15, 23, 27, 35, 108, LC1, LC2) from among a plurality of operating devices including said feeding device (108) and said first antenna device (LC1) or information corresponding the command signal, to said IC circuit part (151) of said RFID circuit element (To) provided at said tag medium (101; 101'; 101") via said first antenna device (LC1) so as to produce a command RFID tag (Tm);
    a second antenna device (LC2) that transmits and receives information via wireless communication to and from said RFID circuit element (To) of said command RFID tag (Tm) disposed outside said housing (200), produced by the writing of said writing control portion (S440);
    a reading control portion (S3030) that acquires said command signal or information corresponding the command signal from said RFID circuit element (To) via said second antenna device (LC2); and
    a device control portion (S3420), based on information obtained by said reading control portion (S3030), that controls said at least one operating device (15, 23, 27, 35, 108, LC1, LC2) so as to perform the corresponding operation.

2. The RFID tag producing apparatus according to claim 1, wherein:
    said tag medium is a tag tape (101; 101'; 101") in which a plurality of said RFID circuit elements (To) are arranged;
    said feeding device (108) feeds said tag tape (101; 101'; 101"); and said command RFID tag is a command RFID label (Tm) capable of being attached to an object to be affixed, produced by using said tag tape (101; 101'; 101") in which said the writing to said RFID circuit element have been practiced;

3. The RFID tag producing apparatus according of claim 2, further comprising a printing device (23) that prints to said tag tape (101; 101") or to a print-receiving tape (103) attached thereto, wherein:
    said writing control portion (S440) writes the command signal or the information corresponding thereto for commanding at least one operating device (15, 23, 27, 35, 108, LC1, LC2) from among said plurality of operating devices (15, 23, 27, 35, 108, LC1, LC2) including said feeding device (108), said printing device (23), and said first antenna device (LC1) to said IC circuit part (151) of said RFID circuit element (To) via said first antenna device (LC1).

4. The RFID tag producing apparatus according to claim 3, wherein:
    said device control portion (S3420) controls, based on said command signal according to information acquisition of said reading control portion (S3030), or based on an operation signal for commanding operation of said at least one of operating devices (15, 23, 27, 35, 108, LC1, LC2) output from an operation device (14, 90, 118b) operatable by an operator, the corresponding operating devices (15, 23, 27, 35, 108, LC1, LC2) so as to perform the corresponding operation.

5. The RFID tag producing apparatus according to claim 4, wherein:
    said RFID tag producing apparatus is capable of selectively executing a command label producing mode for producing said command RFID label (Tm) in which said command signal or the information corresponding thereto are stored in said IC circuit part (151) of said RFID circuit element (To), and a command operation mode for executing said corresponding operation based on said operation signal.

6. The RFID tag producing apparatus according to claim 5, further comprising:
    a cartridge holder (6) onto and from which a cartridge (7; 7'; 7") provided with said tag tape can be mounted and removed; and
    a cartridge detecting device (81) that detects the type of said cartridge (7; 7'; 7") mounted on said cartridge holder (6).

7. The RFID tag producing apparatus according to claim 6, further comprising a mode switching portion (S3415) that selectively switches said command label producing mode and said command operation mode according to a detection results of said cartridge detecting device (81).

8. The RFID tag producing apparatus according to claim 5, wherein:
    said writing control portion (S440) and said device control portion (S3420) selectively execute a control operation in response to a common operation signal from said operation device (14, 90, 118b) according to the mode, such that when in said command label producing mode, said writing control portion (S440) writes said command signal corresponding to said operation signal or information corresponding thereto to said IC circuit part (151) of said RFID circuit element (To), and when in said command operation mode, said device control portion (S3420) causes said at least one of operating devices (15, 23, 27, 35, 108, LC1, LC2) in response to said operation signal to perform the corresponding operation.

9. The RFID producing apparatus according to claim 8, wherein:
said writing control portion (S440) writes a printing command signal or information corresponding thereto for causing said printing device (23) to perform predetermined printing to said IC circuit part (151) of said RFID circuit element (To) in said command label producing mode and said device control portion (S3420) controls said printing device (23) so as to perform said predetermined printing in said command operation mode, in response to the common operation signal from said operation device (14, 90, 118*b*).

* * * * *